(12) United States Patent
Sidhu et al.

(10) Patent No.: US 8,050,255 B2
(45) Date of Patent: Nov. 1, 2011

(54) ROUTING A VOIP CALL WITH CONTEXTUAL INFORMATION

(75) Inventors: Gursharan S Sidhu, Seattle, WA (US); Kuansan Wang, Bellevue, WA (US); Michael D Malueg, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 1192 days.

(21) Appl. No.: 11/432,163

(22) Filed: May 10, 2006

(65) Prior Publication Data

US 2007/0265830 A1 Nov. 15, 2007

(51) Int. Cl.
*H04L 12/66* (2006.01)

(52) U.S. Cl. ........ 370/353; 370/354; 370/401; 704/270; 709/223

(58) Field of Classification Search ............. 370/401, 370/352, 353, 354; 379/265.05, 265.09; 704/270; 709/223
See application file for complete search history.

(56) References Cited

U.S. PATENT DOCUMENTS

| | | | |
|---|---|---|---|
| 5,884,032 A | 3/1999 | Bateman et al. ............... 709/204 |
| 6,411,687 B1 | 6/2002 | Bohacek et al. ............. 379/88.21 |
| 6,442,547 B1 | 8/2002 | Bowman-Amuah ............. 707/10 |
| 6,625,258 B1 | 9/2003 | Ram et al. ................. 379/88.13 |
| 6,671,355 B1 | 12/2003 | Spielman et al. .......... 379/88.12 |
| 6,704,303 B1 | 3/2004 | Bowman-Amuah .......... 370/352 |
| 7,149,301 B2 | 12/2006 | Yoshida et al. .......... 379/218.01 |
| 7,231,404 B2 | 6/2007 | Paila et al. ................. 707/104.1 |
| 7,376,129 B2 | 5/2008 | Acharya et al. .............. 370/352 |
| 7,426,538 B2 | 9/2008 | Bodin et al. .................. 709/204 |
| 7,443,834 B1 | 10/2008 | Sylvain ....................... 370/352 |
| 7,509,124 B2 | 3/2009 | O'Neil ........................ 455/432.2 |
| 7,724,743 B2 | 5/2010 | Razdan et al. ................. 370/392 |
| 7,774,790 B1 | 8/2010 | Jirman et al. .................. 719/318 |
| 7,983,247 B2 | 7/2011 | Howell et al. ................. 370/352 |
| 2002/0035474 A1 | 3/2002 | Alpdemir ....................... 704/270 |
| 2002/0085696 A1 | 7/2002 | Martin et al. ............. 379/201.03 |
| 2003/0172175 A1 | 9/2003 | McCormack et al. ........ 709/232 |

(Continued)

FOREIGN PATENT DOCUMENTS

EP 1 107 549 6/2001

(Continued)

OTHER PUBLICATIONS

AudioTX Communicator, "What is Communicator?" ISDN Codec and Audio over IP Network Software Solution; accessed Jun. 2, 2006 at http://www.audiotx.com/main.html.

(Continued)

*Primary Examiner* — Simon Sing
*Assistant Examiner* — Simon King
(74) *Attorney, Agent, or Firm* — Merchant & Gould

(57) ABSTRACT

A method and system for routing a call connection signal and corresponding contextual information to an appropriate destination is provided. A call center and at least one user may exchange signals, and/or contextual information during a call set-up phase. Relevant contextual information and other detailed information may be identified and collected from their corresponding sources. Based on the relevant contextual information and other detailed information, one or more appropriate routed destinations may be determined. In addition, contextual information may be tailored for each of the determined routed destinations. The call connection signal and the tailored contextual information are routed to each routed destination. In this manner, necessary contextual information may be readily available for the routed destination at the time of the call connection and thus the routed destination can provide a faster service.

20 Claims, 22 Drawing Sheets

Fig.13.

U.S. PATENT DOCUMENTS

| | | | |
|---|---|---|---|
| 2003/0215078 A1 | 11/2003 | Brahm et al. | 379/211.02 |
| 2004/0141508 A1* | 7/2004 | Schoeneberger et al. | 370/401 |
| 2004/0258216 A1 | 12/2004 | Reid | 379/88.13 |
| 2005/0039216 A1 | 2/2005 | Oota | 725/111 |
| 2005/0044197 A1 | 2/2005 | Lai | 709/223 |
| 2005/0281284 A1 | 12/2005 | Shim et al. | 370/465 |
| 2005/0286711 A1 | 12/2005 | Lee et al. | 379/399.01 |
| 2006/0015580 A1 | 1/2006 | Gabriel et al. | 709/219 |
| 2006/0077956 A1 | 4/2006 | Saksena et al. | 370/352 |
| 2006/0153357 A1 | 7/2006 | Acharya et al. | 379/266.01 |
| 2007/0230443 A1 | 10/2007 | Milstein et al. | 370/352 |
| 2007/0239685 A1 | 10/2007 | Howell et al. | 707/3 |
| 2007/0265990 A1 | 11/2007 | Sidhu et al. | 705/418 |
| 2007/0280204 A1 | 12/2007 | Howell et al. | 370/352 |
| 2008/0052400 A1 | 2/2008 | Ekberg | 709/227 |
| 2008/0101339 A1 | 5/2008 | Forbes et al. | 370/352 |
| 2009/0083426 A1 | 3/2009 | Cagenius | 709/227 |

FOREIGN PATENT DOCUMENTS

EP         1 548 997        6/2005

OTHER PUBLICATIONS

Cisco Systems, "IP Phones for all Business Environments," Cisco 7900Series IP Phones—Products and Services—Cisco Systems, access Feb. 2, 2006 at http://www.cisco.com/en/US/products/hw/phones/ps379.index.html.
Office Action dated May 12, 2008, issued in U.S. Appl. No. 11/400,612.
Office Action dated Nov. 25, 2008, issued in U.S. Appl. No. 11/400,612.
Office Action dated Nov. 28, 2008, issued in U.S. Appl. No. 11/444,746.
Office Action dated Jun. 9, 2009, issued in U.S. Appl. No. 11/444,746.
Office Action dated Jun. 10, 2009, issued in U.S. Appl. No. 11/400,612.
Office Action dated Sep. 29, 2009, issued in U.S. Appl. No. 11/444,746.
Office Action dated Jan. 11, 2010, issued in U.S. Appl. No. 11/400,612.
Office Action dated Apr. 1, 2010, issued in U.S. Appl. No. 11/444,746.
Office Action dated Apr. 15, 2010, issued in U.S. Appl. No. 11/431,957.
Office Action dated Sep. 27, 2010, issued in U.S. Appl. No. 11/431,957.
Office Action dated Feb. 1, 2011, issued in U.S. Appl. No. 11/555,587.
Office Action dated Feb. 2, 2011, issued in U.S. Appl. No. 11/444,746.
Office Action dated Mar. 16, 2011, issued in U.S. Appl. No. 11/431,957.
Office Action dated Aug. 25, 2010, issued in U.S. Appl. No. 11/444,746.
Office Action dated Jun. 27, 2011, issued in U.S. Appl. No. 11/555,587.
Office Action dated Aug. 30, 2011, issued in U.S. Appl. No. 11/431,957.

* cited by examiner

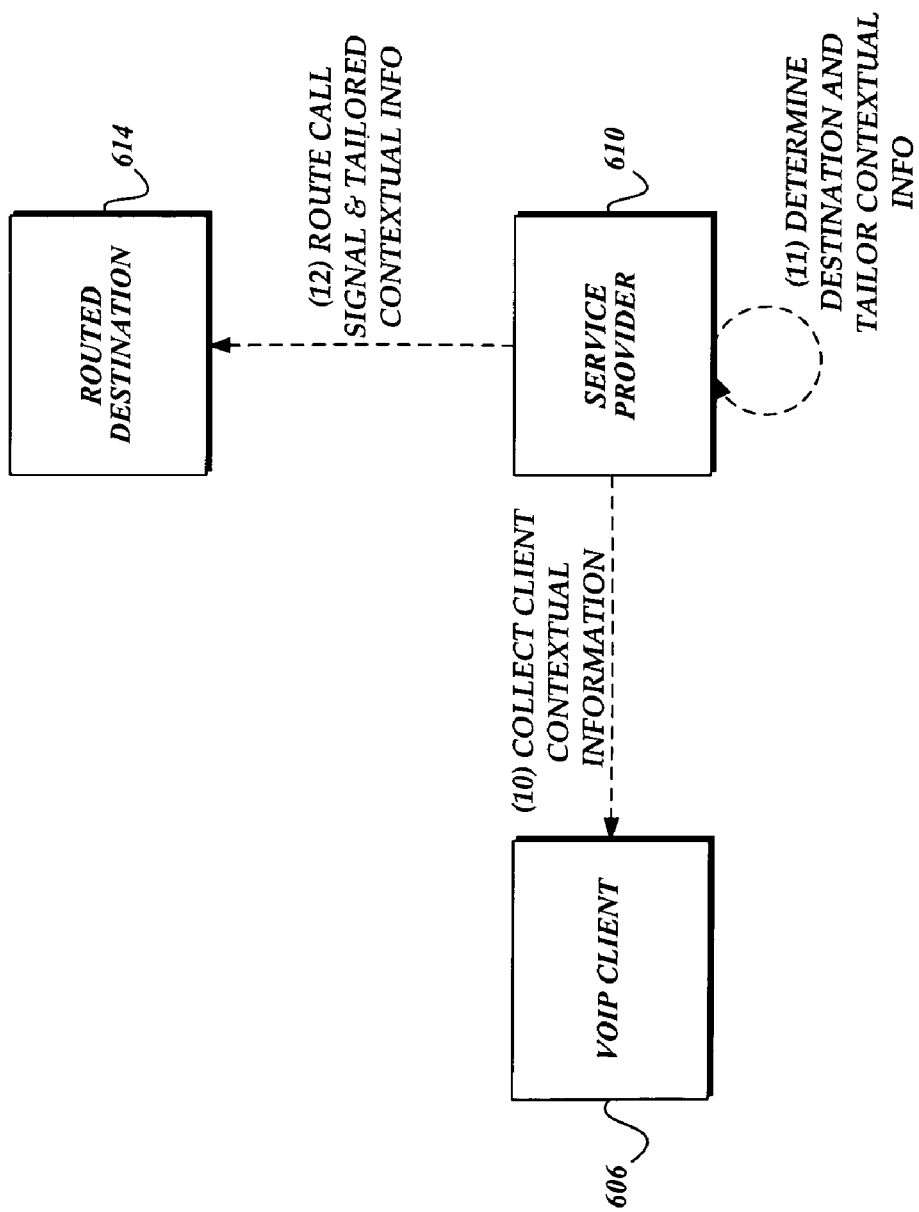

ROUTING A VOIP CALL WITH CONTEXTUAL INFORMATION

BACKGROUND

Generally described, an Internet telephony system provides an opportunity for users to have a call connection with enhanced calling features compared to a conventional Public Switched Telephone Network (PSTN)-based telephony system. In a typical Internet telephony system, often referred to as Voice over Internet Protocol (VoIP), audio information is processed into a sequence of data blocks, called packets, for communications utilizing an Internet Protocol (IP) data network. During a VoIP call conversation, the digitized voice is converted into small frames of voice data and a voice data packet is assembled by adding an IP header to the frame of voice data that is transmitted and received.

VoIP technology has been favored because of its flexibility and portability of communications, ability to establish and control multimedia communication, and the like. VoIP technology will likely continue to gain favor because of its ability to provide enhanced calling features and advanced services which the traditional telephony technology has not been able to provide. However, the current VoIP approach may not provide a method or a system to route a call and appropriate contextual information based on a need of a responding party.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method and system for routing a call-connection signal and corresponding contextual information to an appropriate destination is provided. A call center and at least one user may exchange signals and/or contextual information during a call set-up phase. Relevant contextual information and other detailed information may be identified and collected from their corresponding sources. Based on the relevant contextual information and other detailed information, one or more appropriate routed destinations may be determined. In addition, contextual information may be tailored for each of the determined routed destinations. The call-connection signal and the tailored contextual information are routed to each routed destination. In this manner, necessary contextual information may be readily available for the routed destination at the time of the call connection and thus the routed destination can provide a faster service.

In an aspect of the present invention, a method for collecting and transmitting contextual information for routing a call-initiation signal for a communication channel and relevant contextual information received from a calling client may be provided. A final destination of the communication channel may be identified. An example of the final destination may be a particular call center. It is determined as to whether an appropriate application relating to the destination, which corresponds to contextual information, is locally available. If it is, the appropriate application may be selected to collect and transmit a first set of contextual information. Upon collecting the first set of contextual information, a communication channel connection may be initiated by sending a call-initiation signal to the identified destination along with the first set of contextual information in accordance with the appropriate application. If the appropriate application is not available, contextual information corresponding to the appropriate application may be obtained from a proper source such as the identified destination. The appropriate application can also be obtained from a service provider, a centralized database server, other VoIP clients, and the like. A response to the call-initiation signal and the destination's contextual information may be received. The response may be rejecting or accepting the call-initiation signal, requesting additional information, and/or other appropriate actions.

In an aspect of the method, the response may indicate that additional information is required to establish a communication channel with the destination. A next set of contextual information corresponding to the additional information may be identified, collected and transmitted. In one embodiment, a response to the next set of contextual information may be received. When the response indicates that the call initiation is accepted, a communication channel between the caller and the destination may be established. The contextual information and media information including voice information (conversation) are continued to be exchanged over the established communication channel between the caller and the destination. During such conversation, the information relating to changes in the caller's contextual information may continue to be collected and transmitted. Likewise, in response to the caller's contextual information, the destination may send a response and/or destination's contextual information.

In another aspect of the present invention, a method for routing an incoming request to a routed destination and for collecting and providing contextual information tailored for the routed destination is provided. An incoming request to initiate a communication channel is received. It is determined as to whether contextual information in conjunction with the incoming request has been received. If any contextual information has been received along with the incoming request signal, the contextual information is processed. A proper response in accordance with the processed contextual information is transmitted. Further, additional contextual information may be received. If no contextual information has been received, necessary contextual information to determine a routed destination may be collected and/or obtained from the calling party, a service provider, third party service provider, and the like. The collected and/or obtained contextual information may be processed. A subset or all of the contextual information may be locally stored for future use. Other detailed information related to the calling party, for example, past services, history, and the like may be collected. Relevant contextual information to determine the routed destination may be identified.

Based on the relevant contextual information and other detailed information, one or more appropriate routed destinations may be determined. If no contextual information is obtained or collected, a default destination may be selected as an appropriate routed destination. A subset of the contextual information and other detailed information may be tailored for each appropriate routed destination. Further, additional information which may be useful to the appropriate routed destinations may be collected and/or obtained from a proper source and added into the tailored contextual information. Subsequently, the incoming request signal and the tailored contextual information are routed to the routed destination.

In yet another aspect of the present invention, a computer-readable medium having computer-executable components for routing an incoming request signal for establishing a communication channel and relevant contextual information is provided. The computer-readable medium may include an interface component for receiving the incoming request signal for establishing a communication channel and contextual information relating to a calling client (calling party). The interface component further identifies and obtains additional information. The additional information may also be obtained from at least one of the requesting party, third party service providers, service providers, or the storage component. The computer-readable medium may further include a routing component for determining a destination for the incoming request signal based on the contextual information. The routing component further forwards (routes) the incoming request signal and appropriate contextual information to the routed destination. In one embodiment, the appropriate contextual information may be tailored based on the need of the destination. The computer-readable medium may also include a storage component for storing information relating to detailed information such as history and previous communications with the calling party, information relating to the routed destination, the calling party's contextual information, and other additional information. The interface component further obtains information relating to changes in previously received contextual information. The routing component dynamically selects another destination based on the information relating to changes, reroutes the incoming request signal to the selected destination, and provides appropriate information to the selected destination. Voice information and contextual information are exchanged between the selected destination and the calling party. In this manner, the exchanged contextual information may be dynamically evaluated and used for a base to alter a destination of the communication channel during a conversation.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 7A and 7B are block diagrams illustrating interactions between VoIP entities for collecting and routing contextual information to a destination in accordance with an aspect of the present invention;

DETAILED DESCRIPTION

Generally described, the present invention relates to a method and system for collecting and routing information relating to a service requested by a VoIP client or other service providers to a routed destination over a communication channel. More specifically, the present invention relates to a method and system for identifying contextual information, in response to a call-initiation signal for a service, collecting the identified contextual information represented according to "structured hierarchies," and routing the call signal and the collected contextual information to an appropriate destination. "Structured hierarchies," as used herein, are predefined organizational structures for arranging contextual information to be exchanged between two or more VoIP devices. For example, structured hierarchies may be XML namespaces. Further, a VoIP conversation includes one or more data streams of information related to a conversation, such as contextual information and voice/multimedia information, exchanged over a conversation channel. Suitable user interfaces adaptive to contextual information may be utilized to collect further contextual information. Although the present invention will be described with relation to illustrative structured hierarchies and an IP telephony environment, one skilled in the relevant art will appreciate that the disclosed embodiments are illustrative in nature and should not be construed as limiting.

Figure 1:
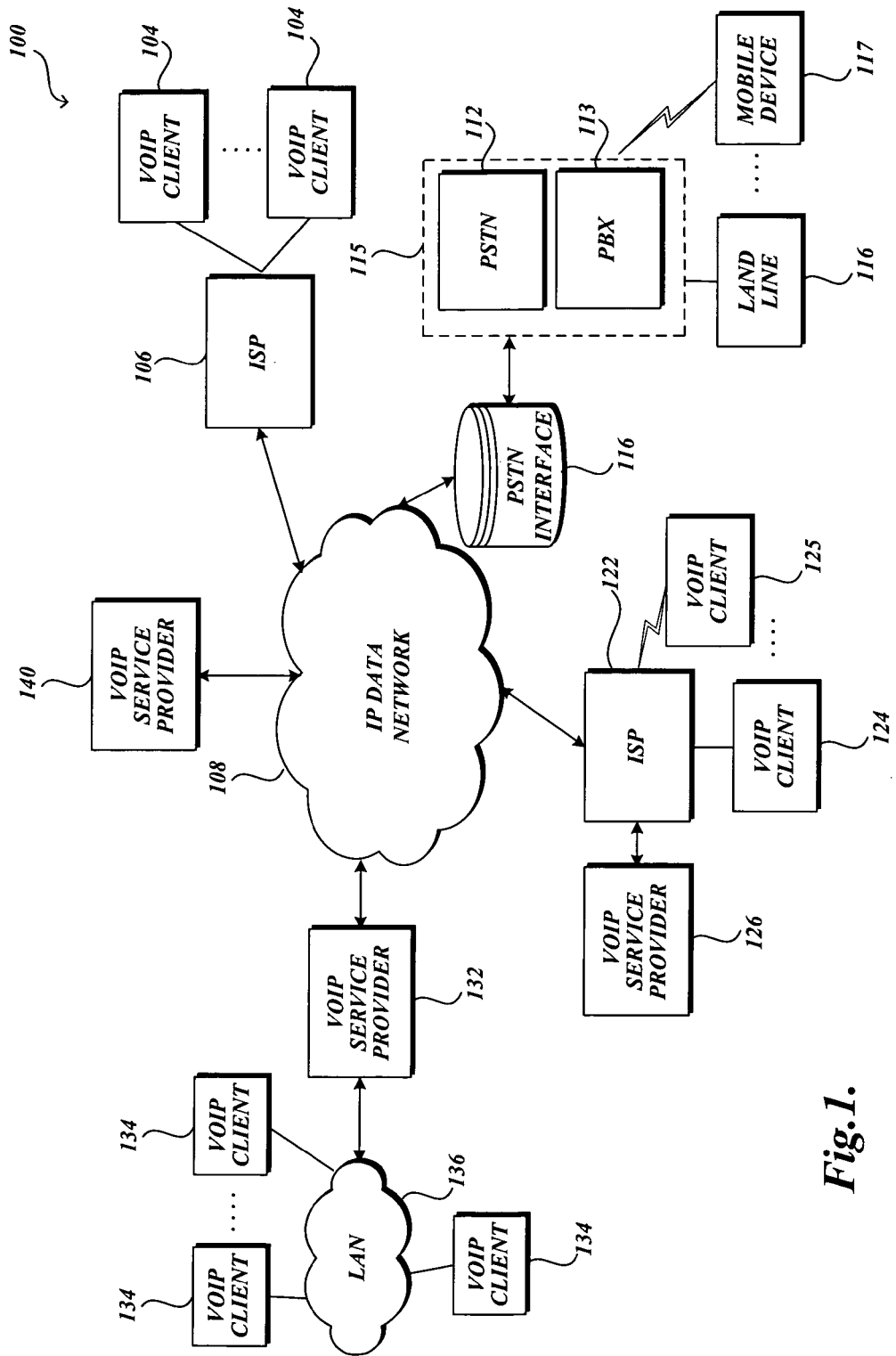
FIG. 1 is a block diagram illustrative of a VoIP environment for establishing a conversation channel between various clients in accordance with an aspect of the present invention.

With reference to FIG. 1, a block diagram of an IP telephony environment 100 for providing IP telephone services between various "VoIP clients" is shown. A "VoIP client," as used herein, refers to a particular contact point, such as an individual, an organization, a company, etc., one or more associated VoIP devices and a unique VoIP client identifier. For example, a single individual, five associated VoIP devices and a unique VoIP client identifier may collectively makeup a VoIP client. Similarly, a company including five hundred individuals and over one thousand associated VoIP devices may also be collectively referred to as a VoIP client and that VoIP client may be identified by a unique VoIP client identifier. Moreover, VoIP devices may be associated with multiple VoIP clients. For example, a computer (a VoIP device) located in a residence in which three different individuals live where each individual is associated with separate VoIP clients, may be associated with each of the three VoIP clients. Regardless of the combination of devices, the unique VoIP client identifier may be used within a voice system to reach the contact point of the VoIP client.

Generally described, the IP telephony environment 100 may include an IP data network 108 such as the Internet, an intranet network, a wide area network (WAN), a local area network (LAN), and the like. The IP telephony environment 100 may further include VoIP service providers 126, 132 providing VoIP services to VoIP clients 124, 125, 134. A VoIP call conversation may be exchanged as a stream of data packets corresponding to voice information, media information, and/or contextual information. As will be discussed in greater detail below, the contextual information includes metadata (information of information) relating to the VoIP conversation, the devices being used in the conversation, the contact point of the connected VoIP clients, and/or individuals that are identified by the contact point (e.g., employees of a company).

The IP telephony environment 100 may also include third party VoIP service providers 140. The VoIP service providers 126, 132, 140 may provide various calling features, such as incoming call-filtering, text data, voice and media data integration, and the integrated data transmission as part of a VoIP call conversation. VoIP clients 104, 124, 125, 136 may create, maintain, and provide information relating to predetermined priorities for incoming calls. In addition, the VoIP service providers 126, 132, 140 may also generate, maintain, and provide a separated set of metadata information (e.g., provider priority list) for individuals communicating in a call conversation. The VoIP service providers 126, 132, 140 may determined and assign an appropriate priority level to data packets based on priority information provided by VoIP clients 104, 124, 125, 136 in conjunction with the provider priority list.

VoIP service providers 132 may be coupled to a private network such as a company LAN 136, providing IP telephone services (e.g., internal calls within the private network, external calls outside of the private network, and the like) and multimedia data services to several VoIP clients 134 communicatively connected to the company LAN 136. Similarly, VoIP service providers, such as VoIP service provider 126, may be coupled to Internet Service Provider (ISP) 122, providing IP telephone services and VoIP services for clients of the ISP 122.

In one embodiment, one or more ISPs 106, 122 may be configured to provide Internet access to VoIP clients 104, 124, 125 so that the VoIP clients 104, 124, 125 can maintain conversation channels established over the Internet. The VoIP clients 104, 124, 125 connected to the ISP 106, 122 may use wired and/or wireless communication lines. Further, each VoIP client 104, 124, 125, 134 can communicate with Plain Old Telephone Service (POTS) 115 via PSTN 112, or Private Branch exchange (PBX) 113. A PSTN interface 114 such as a PSTN gateway may provide access between POTS/PSTN and the IP data network 108. The PSTN interface 114 may translate VoIP data packets into circuit switched voice traffic for PSTN and vice versa. The PSTN 112 may include a land line device 116, a mobile device 117, and the like.

Conventional voice devices, such as land line 116 may request a connection with the VoIP client based on the unique client identifier of that client and the appropriate VoIP device associated with the VoIP client, will be used to establish a connection. In one example, an individual associated with the VoIP client may specify which devices are to be used in connecting a call based on a variety of conditions (e.g., connection based on the calling party, the time of day, etc.).

It is understood that the above-mentioned configuration in the environment 100 is merely exemplary. It will be appreciated by one of ordinary skill in the art that any suitable configurations with various VoIP entities can be part of the environment 100. For example, VoIP clients 134 coupled to LAN 136 may be able to communicate with other VoIP clients 104, 124, 125, 134 with or without VoIP service providers 132 or ISP 106, 122. Further, an ISP 106, 122 can also provide VoIP services to its client.

Figure 2:
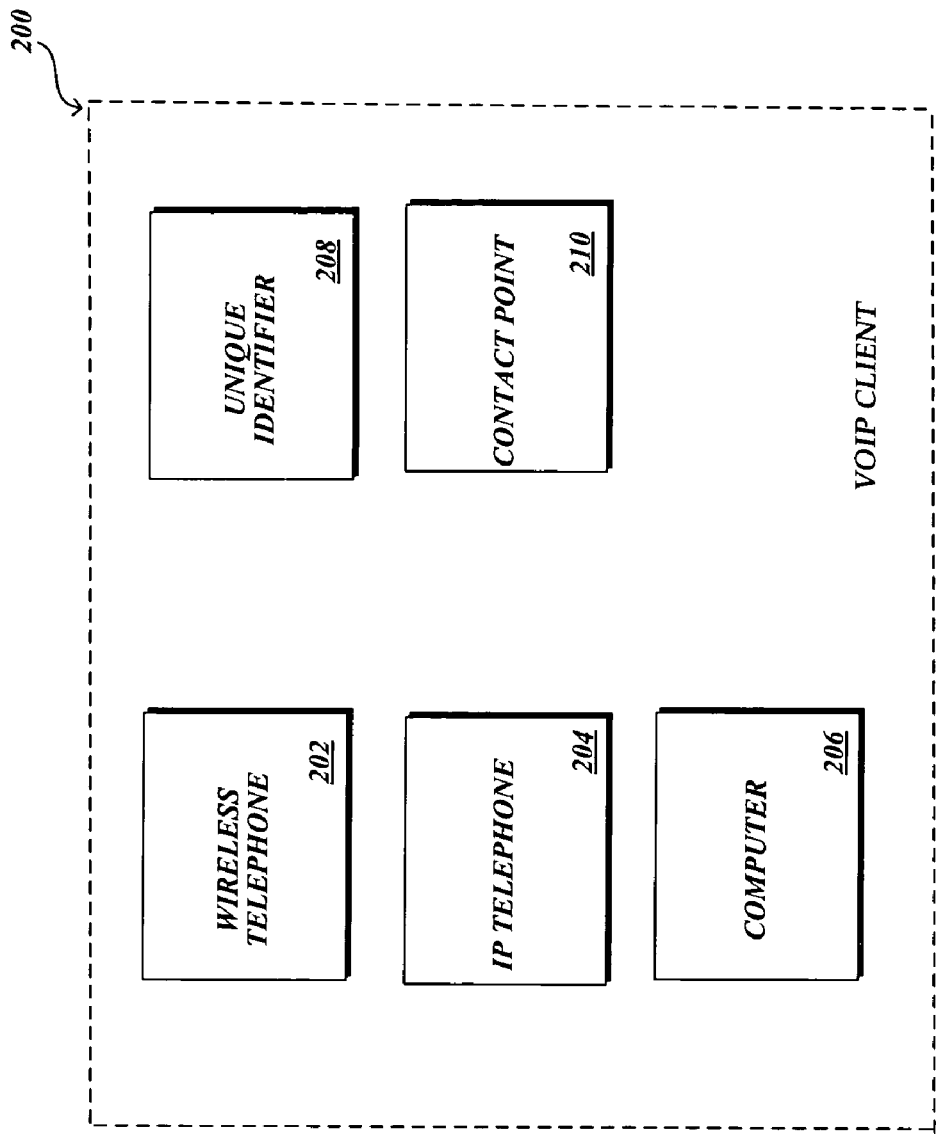
FIG. 2 is a block diagram illustrative of a VoIP client in accordance with an aspect of the present invention.

Referring now to FIG. 2, a block diagram illustrating an exemplary VoIP client 200 that includes several VoIP devices and a unique VoIP identifier, in accordance with an embodiment of the present invention, is shown. Each VoIP device 202, 204, 206 may include a storage that is used to maintain voice messages, address books, client specified rules, priority information related to incoming calls, etc. Alternatively, or in addition thereto, a separate storage, maintained for example by a service provider, may be associated with the VoIP client and accessible by each device that contains information relating to the VoIP client. In an embodiment, any suitable VoIP device such as a wireless phone 202, an IP phone 204, or a computer 206 with proper VoIP applications may be part of the VoIP client 200. The client 200 also maintains one or more unique client identifiers 208. The unique client identifier(s) 208 may be constant or change over time. For example, the unique client identifier(s) 208 may change with each call. The unique client identifier is used to identify the client and to connect with the contact point 210 associated with the client. The unique client identifier may be maintained on each device included in the client and/or maintained by a service provider that includes an association with each VoIP device included in the client. In the instance in which the unique client identifier is maintained by a service provider, the service provider may include information about each associated device and knowledge as to which device(s) to connect for incoming communications. In an alternative embodiment, the client 200 may maintain multiple identifiers. In this embodiment, a unique client identifier may be temporarily assigned to the client 200 for each call session.

The unique client identifier may be used similar to a telephone number in PSTN. However, instead of dialing a typical telephone number to ring a specific PSTN device, such as a home phone, the unique client identifier is used to reach a contact point, such as an individual or company, which is associated with the VoIP client. Based on the arrangement of the client, the appropriate device(s) will be connected to reach the contact point. In one embodiment, each device included in the client may also have its own physical address in the network or a unique device number. For example, if an individual makes a phone call to a POTS client using a personal computer (VoIP device), the VoIP client identification number in conjunction with an IP address of the personal computer will eventually be converted into a telephone number recognizable in PSTN.

Figure 3:
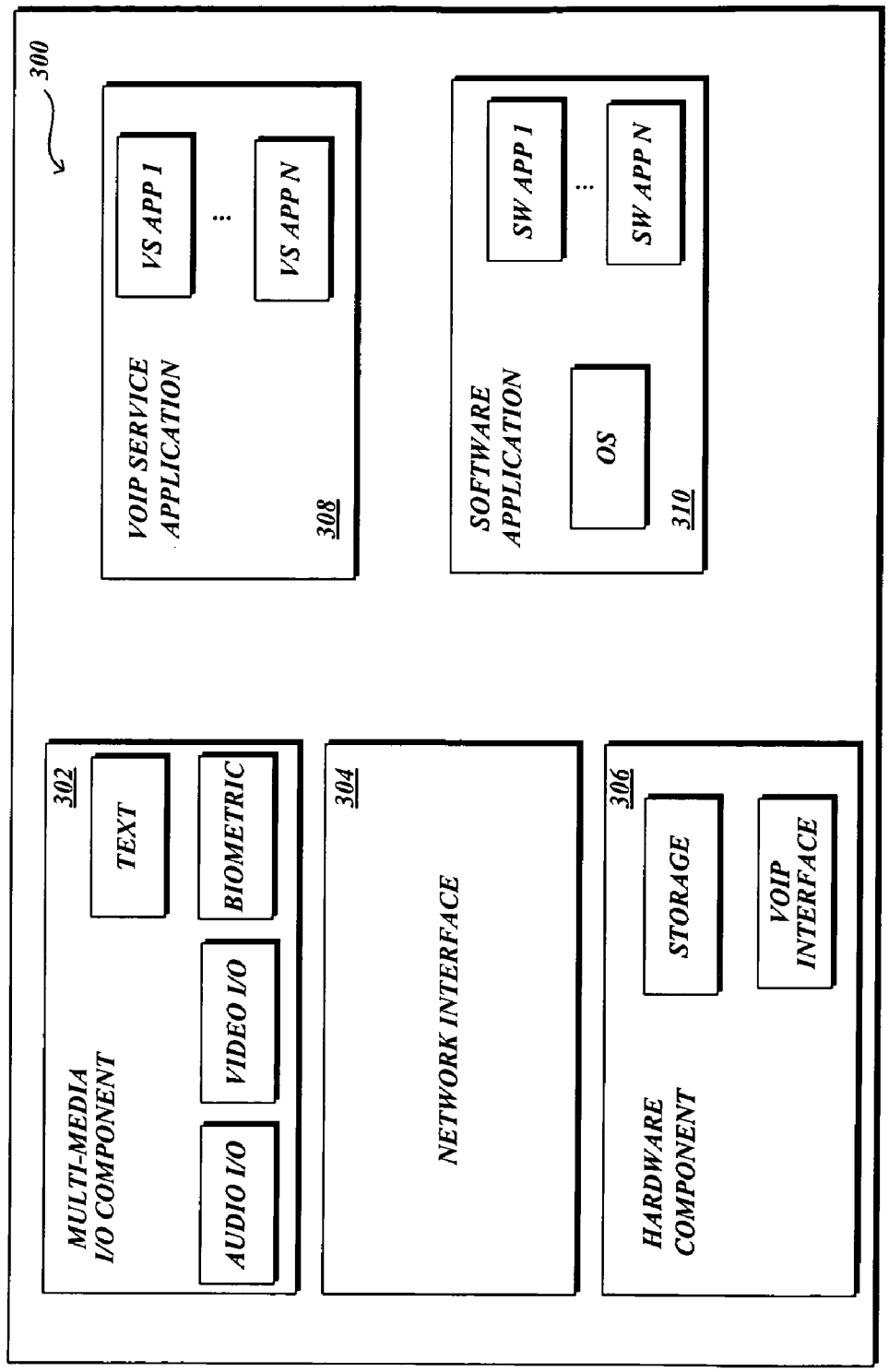
FIG. 3 is a block diagram illustrative of various components associated with a VoIP device in accordance with an aspect of the present invention.

FIG. 3 is a block diagram of a VoIP device 300 that may be associated with one or more VoIP clients and used with embodiments of the present invention. It is to be noted that the VoIP device 300 is described as an example. It will be appreciated that any suitable device with various other components can be used with embodiments of the present invention. For utilizing VoIP services, the VoIP device 300 may include components suitable for receiving, transmitting and processing various types of data packets. For example, the VoIP device 300 may include a multimedia input/output component 302 and a network interface component 304. The multimedia input/output component 302 may be configured to input and/or output multimedia data (including audio, video, and the like), user biometrics, text, application file data, etc.

The multimedia input/output component 302 may include any suitable user input/output components such as a microphone, a video camera, a display screen, a keyboard, user biometric recognition devices, and the like. The multimedia input/output component 302 may also receive and transmit multimedia data via the network interface component 304. The network interface component 304 may support interfaces such as Ethernet interfaces, frame relay interfaces, cable interfaces, DSL interfaces, token ring interfaces, radio frequency (air interfaces), and the like. The VoIP device 300 may comprise a hardware component 306 including permanent and/or removable storage such as read-only memory devices (ROM), random access memory (RAM), hard drives, optical drives, and the like. The storage may be configured to store program instructions for controlling the operation of an operating system and/or one or more applications, and to store contextual information related to individuals (e.g., voice profiles, user biometrics information, etc.) associated with the VoIP client in which the device is included. In one embodiment, the hardware component 306 may include a VoIP interface card which allows a non-VoIP client device to transmit and receive a VoIP conversation.

The device 300 may further include a software application component 310 for the operation of the device 300 and a VoIP Service application component 308 for supporting various VoIP services. The VoIP service application component 308 may include applications such as data packet assembler/disassembler applications, a structured hierarchy parsing application, audio Coder/Decoder (CODEC), video CODEC and other suitable applications for providing VoIP services. The CODEC may use voice profiles to filter and improve incoming audio.

Figure 4:
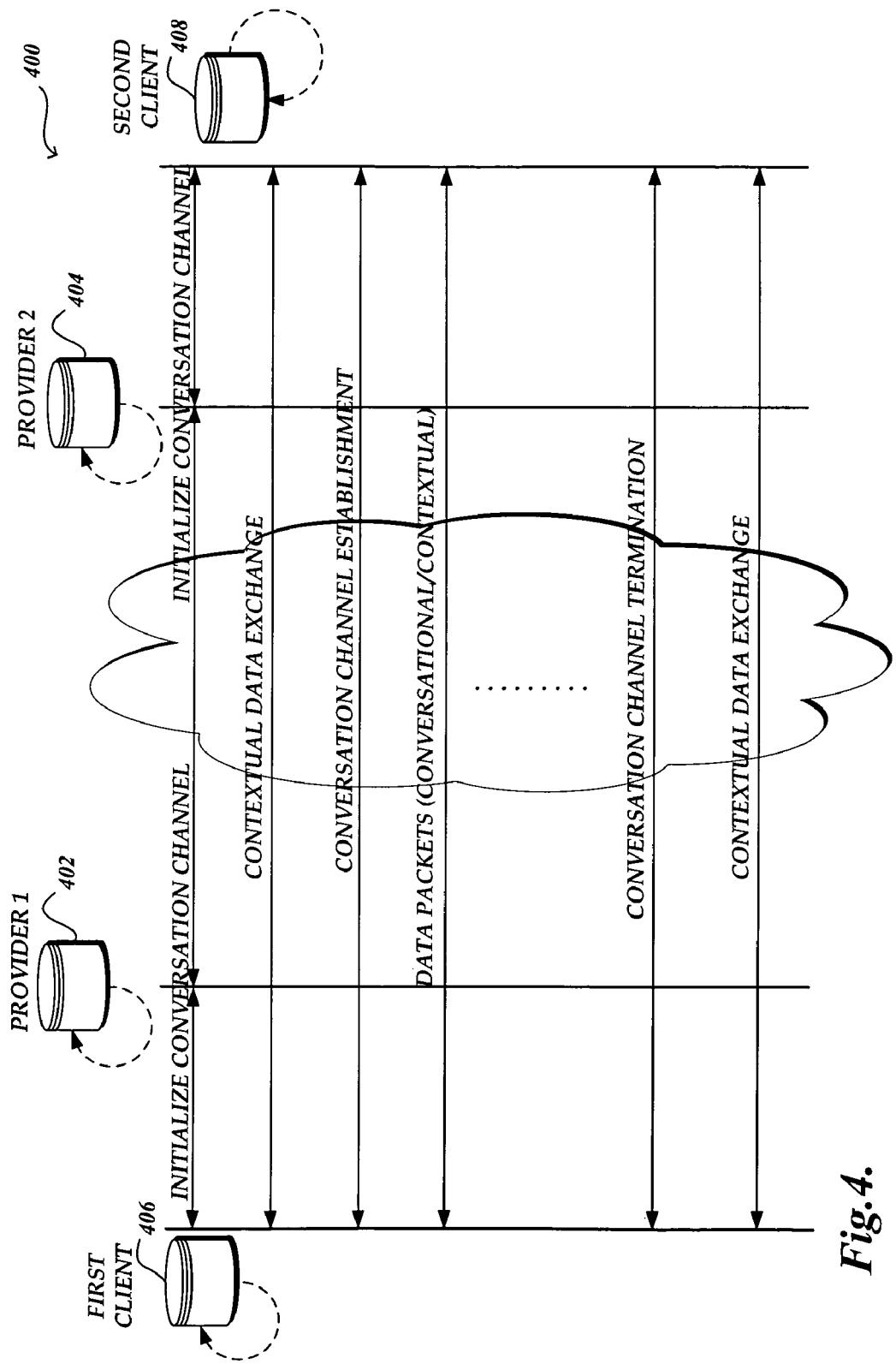
FIG. 4 is a block diagram illustrative of the exchange of data between two VoIP clients over a conversation channel in accordance with an aspect of the present invention.

With reference to FIG. 4, a block diagram illustrative of a conversation flow 400 between VoIP devices of two different VoIP clients over a conversation channel, in accordance with an embodiment of the present invention, is shown. During a connection set-up phase, a VoIP device of a first VoIP client 406 requests to initiate a conversation channel with a second VoIP client 408. In an illustrative embodiment, a VoIP service provider 402 (Provider 1) for the first VoIP client 406 receives the request to initiate a conversation channel and forwards the request to a VoIP service provider 404 (Provider 2) for the second VoIP client 406. While this example utilizes two VoIP service providers and two VoIP clients, any number and combination of VoIP clients and/or service providers may be used with embodiments of the present invention. For example, only one service provider may be utilized in establishing the connection. In yet another example, communication between VoIP devices may be direct, utilizing public and private lines, thereby eliminating the need for a VoIP service provider. In a peer to peer context, communication between VoIP devices may also be direct without having any service providers involved.

There are a variety of protocols that may be selected for use in exchanging information between VoIP clients, VoIP devices, and/or VoIP service providers. For example, when Session Initiation Protocol (SIP) is selected for a signaling protocol, session control information and messages will be exchanged over a SIP signaling path/channel and media streams will be exchanged over Real-Time Transport Protocol (RTP) path/channel. For the purpose of discussion, a communication channel, as used herein, generally refers to any type of data or signal exchange path/channel. Thus, it will be appreciated that depending on the protocol, a connection set-up phase and a connection termination phase may require additional steps in the conversation flow 400.

For ease of explanation, we will utilize the example in which, the first VoIP client 406 and the second VoIP client 408, each includes only one VoIP device. Accordingly, the discussion provided herein will refer to connection of the two VoIP devices. The individual using the device of the first VoIP client 406 may select or enter the unique VoIP identifier of the client that is to be called. Provider 1 402 receives the request from the device of the first VoIP client 408 and determines a terminating service provider (e.g., Provider 2 404 of the second VoIP client 408) based on the unique VoIP identifier included in the request. The request is then forwarded to Provider 2 404. This call initiation will be forwarded to the device of the second VoIP client. A conversation channel between the device of the first VoIP client 406 and a device of the second VoIP client 408 can then be established.

In an illustrative embodiment, before the devices of the first VoIP client 406 and the second VoIP client 408 begin to exchange data packets, contextual information may be exchanged. As will be discussed in a greater detail below, the contextual information may be packetized in accordance with a predefined structure that is associated with the conversation. Any device associated with the first VoIP client 406, the service provider of the first VoIP client 406, or a different device/service provider may determine the structure based on the content of the contextual information. In one embodiment, the exchanged contextual information may include information relating to the calling VoIP client 406, the device, and the VoIP client 408 being called.

Available media types, rules of the calling client and the client being called, and the like, may also be part of the contextual information that is exchanged during the connection set-up phase. The contextual information may be processed and collected by one of the devices of the first VoIP client 406, one of the devices of the second VoIP client 408, and/or by the VoIP service providers (e.g., Provider 1 402 and Provider 2 404), depending on the nature of the contextual information. In one embodiment, the VoIP service providers 402, 404 may add/delete some information to/from the client's contextual information before forwarding the contextual information.

In response to a request to initiate a conversation channel, the second VoIP client 408 may accept the request for establishing a conversation channel or execute other appropriate actions such as rejecting the request via Provider 2 404. The appropriate actions may be determined based on the obtained contextual information. When a conversation channel is established, a device of the first VoIP client 406 and a device of the second VoIP client 408 start communicating with each other by exchanging data packets. As will be described in greater detail below, the data packets, including conversation data packets and contextual data packets, are communicated over the established conversation channel between the connected devices.

Conversation data packets carry data related to a conversation, for example, a voice data packet, or multimedia data packet. Contextual data packets carry information relating to data other than the conversation data. Once the conversation channel is established, either the first VoIP client 406 or the second VoIP client 408 can request to terminate the conversation channel. Some contextual information may be exchanged between the first VoIP client 406 and the second VoIP client 408 after the termination.

Figure 5:
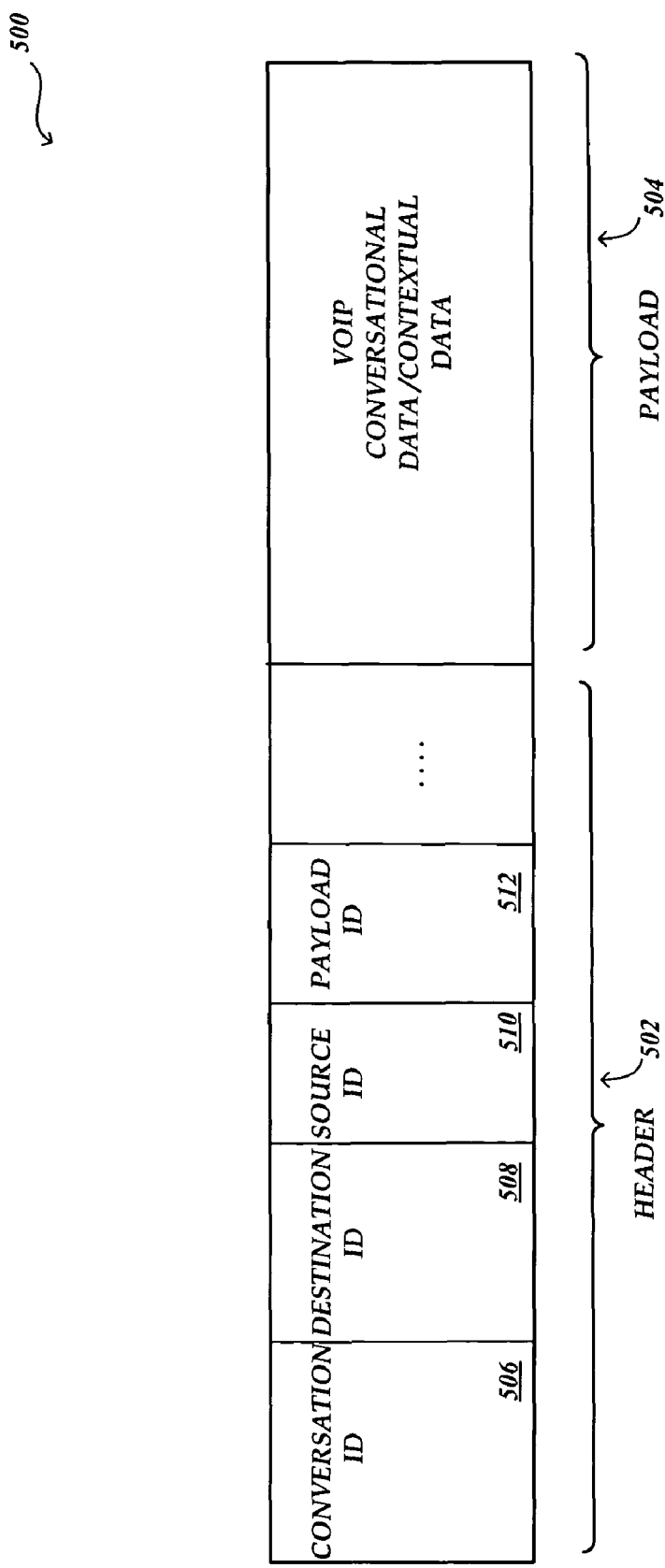
FIG. 5 is a block diagram of a data packet used over a communication channel established in the VoIP environment of FIG. 1.

FIG. 5 is a block diagram of a data packet structure 500 used over a communication (conversation) channel in accordance with an embodiment of the present invention. The data packet structure 500 may be a data packet structure for an IP data packet suitable for being utilized to carry conversation data (e.g., voice, multimedia data, and the like) or contextual data (e.g., information relating to the services, and the like). However, any other suitable data structure can be utilized to carry conversation data or contextual data. The data packet structure 500 includes a header 502 and a payload 504. The header 502 may contain information necessary to deliver the corresponding data packet to a destination. Additionally, the header 502 may include information utilized in the process of a conversation. Such information may include conversation ID 506 for identifying a conversation (e.g., call), a Destination ID 508, such as a unique VoIP identifier of the client being called, a Source ID 510 (unique VoIP identifier of the calling client or device identifier), Payload ID 512 for identifying the type of payload (e.g., conversation or contextual), individual ID (not shown) for identifying the individual to which the conversation data is related, and the like. In an alternative embodiment, the header 502 may contain information regarding Internet protocol versions; and payload length, among others. The payload 504 may include conversational or contextual data relating to an identified conversation. As will be appreciated by one of ordinary skill in the art, additional headers may be used for upper layer headers such as a TCP header, a UDP header, and the like.

In one embodiment of the present invention, a structured hierarchy may be predefined for communicating contextual information over a VoIP conversation channel. The contextual information may include any information relating to clients, devices, conversation channel connections (e.g., call basics), conversation context (e.g., call context), and the like. More specifically, the contextual information may include client preference, client rules, client's location (e.g., user location, device location, etc.), biometrics information, the client's confidential information, VoIP device's functionality, service provider's information, media type, media parameters, calling number priority, keywords, information relating to application files, and the like. The contextual information may be processed and collected at each client and/or the service providers depending on the nature of the contextual data. In one aspect, the service providers may add, modify and/or delete the VoIP client's contextual data before forwarding the contextual information. For example, client's confidential information will be deleted by the service provider associated with that client unless the client authorizes such information to be transmitted. In some cases, a minimal amount of contextual information is transmitted outside of an intranet network.

Figure 6:
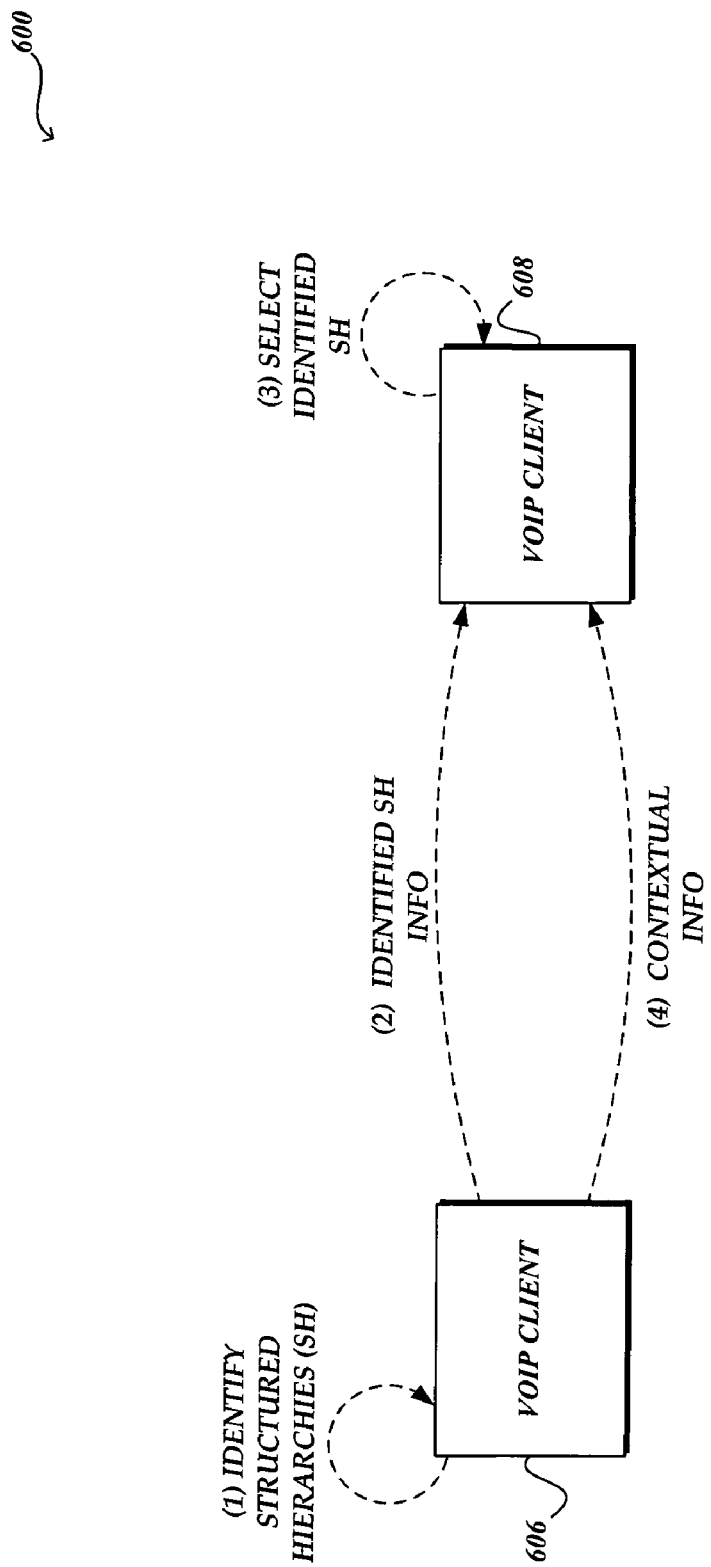
FIG. 6 is a block diagram illustrating interactions between two VoIP clients for transferring contextual information defined by identified structured hierarchies in accordance with an aspect of the present invention.

With reference to FIG. 6, a block diagram 600 illustrating interactions between two clients for transferring contextual information, in accordance with an embodiment of the present invention, is shown. As with FIG. 4, the example described herein will utilize the scenario in which each client only has one device associated therewith and the connection occurs between those two devices. In one embodiment, devices of VoIP Client 606 and VoIP Client 608 have established a VoIP conversation channel. It may be identified which structured hierarchies will be used to carry certain contextual information by Client 606. The information regarding the identified structured hierarchies may include information about which structured hierarchies are used to carry the contextual information, how to identify the structured hierarchy, and the like. Such information will be exchanged between Client 606 and Client 608 before the corresponding contextual information is exchanged. Upon receipt of the information identifying which structured hierarchy will be used to carry the contextual information, Client 608 looks up predefined structured hierarchies (e.g., XML namespace and the like) to select the identified structured hierarchies. In one embodiment, the predefined structured hierarchies can be globally stored and managed in a centralized location accessible from a group of clients. In this embodiment, a Uniform Resource Identifier (URI) address of the centralized location may be transmitted from Client 606 to Client 608.

In another embodiment, each client may have a set of predefined structured hierarchies stored in a local storage of any devices or a dedicated local storage which all devices can share. The predefined structured hierarchies may be declared and agreed upon between VoIP clients before contextual information is exchanged. In this manner, the need to provide the structure of the contextual data packets may be eliminated and thus the amount of transmitted data packets corresponding to the contextual data is reduced. Further, by employing the predefined structured hierarchies, data packets can be transmitted in a manner which is independent of hardware and/or software.

Upon retrieving the identified structured hierarchy, VoIP Client 608 is expecting to receive a data stream such that data packets corresponding to the data stream are defined according to the identified structured hierarchies. VoIP Client 606 can begin sending contextual information represented in accordance with the identified structured hierarchies. In one embodiment, VoIP Client 608 starts a data binding process with respect to the contextual information. For example, instances of the identified structured hierarchies may be constructed with the received contextual information.

Figure 7A:
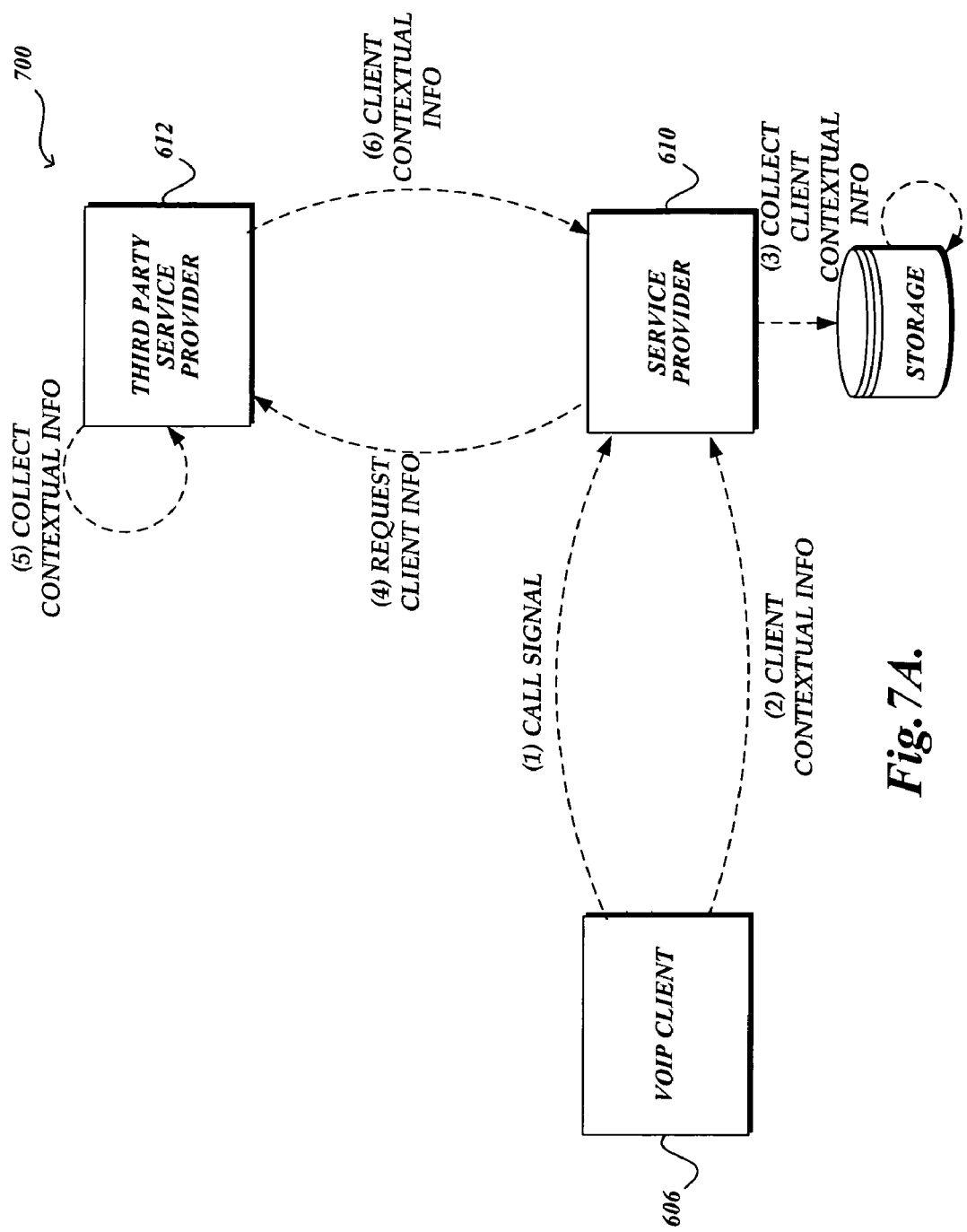

FIGS. 7A and 7B are block diagrams 700 illustrating the collection, and routing of contextual information among entities in accordance with an embodiment of the present invention. In one embodiment, the VoIP entities may include VoIP clients, VoIP service providers for the clients, third party service providers, and the like.

With reference to FIG. 7A, in one embodiment, VoIP Client 608 may send a signal to initiate a call request to a Service Provider (SP) 610. SP 610 may be a service provider on premises (e.g., part of a client if the client is a corporation) or a service provider off premises (an external service provider). As will be described in greater detail below, SP 610 may be any VoIP related service provider, including a call center, a customer support center, a VoIP service provider, an interactive e-commerce server, a centralized client information management server, and the like. Likewise, a signal may be initiated for a call to seek services which can be provided by SP 610. For example, a user may wish to have a conversation with customer service personnel regarding problems in a VoIP device or a VoIP call in a call center environment.

For discussion purposes, assume that VoIP Client 606 has a prearranged agreement with SP 610 (e.g., a call center) for obtaining customer care services for a device. Third party SP 612 may relate to a manufacturer of components of the device, suitable for providing additional information relating to the device. In one embodiment, SP 610 may obtain client's contextual information from VoIP Client 606, which may have been prepackaged in connection with the call-initiation signal for a communication channel. As will be described in greater detail below, it is contemplated that structured hierarchies are utilized to carry contextual information (contextual data packets) between several entities in this illustrative embodiment. SP 610 processes the initiation signal and/or the client's contextual information to identify what information will be further collected and which appropriate source will be contacted, or queried, to obtain the identified information. However, the initial contextual information obtained from the VoIP Client 606 may be sufficient enough for SP 610 to provide services, for example routing a call initiation signal to a routed destination.

If the appropriate source is a third party SP 612, SP 610 requests the identified information and obtains the information from the third party SP 612. SP 610 and the third party SP 612 may exchange more information, including the client contextual information relating to the VoIP Client 606 and/or the device. In an illustrative embodiment, upon receipt of the call-initiation signal, SP 610 obtains (or collects) any readily available information, for example previously obtained contextual information related to VoIP Client 606 and/or the device, previous communications, service history and the like, from its database.

Referring to FIG. 7B, SP 610 obtains the identified information as part of client contextual information from VoIP Client 606 if the appropriate source is VoIP Client 606. In one embodiment, SP 610 may send a request for obtaining such information. Upon receipt of the request, VoIP Client 606 collects the requested information and identifies structured hierarchies which will be used to carry contextual information including the requested information. The identified information may be collected from other devices coupled to VoIP Client 606, other service providers, third party service providers, or the like. The collected contextual information is transmitted from VoIP Client 606 to SP 610 utilizing the identified structured hierarchies. Alternatively, SP 610 may collect the identified information from VoIP Client 606 via a secured connection.

In one embodiment, SP 610 may forward all or subsets of the received information to any VoIP entities, including another service provider or a third party SP 612. SP 610 may process the contextual information relating to VoIP Client 606. SP 610 may further store desired parts of such information which may be used in future services for VoIP Client 610, or the like. As discussed above, SP 610 may further identify and obtain (or collect) additional information relating to the communication channel and update the current contextual information (e.g., previously obtained contextual information) accordingly. In an illustrative embodiment, information may be collected utilizing a Server-Pull method (client provides information upon server's request), a Server-Push method (server pushes information without client's request), or the like. For example, SP 610 may transmit provider contextual information (e.g., contextual information relating to SP 610 including information corresponding to a set of applications) to Client 606 without having any request for such information from VoIP Client 606. The provider contextual information may correspond to embedded instructions for invoking a set of applications for collecting contextual information from a device, an individual user operating the device, VoIP Client 606, etc. In this manner, more contextual information can be collected. In one embodiment, VoIP Client 606 may determine whether a set of applications relating to SP 610 is locally available. If the set of applications is not available, VoIP Client 606 may request the set of applications which will be used for collecting and transmitting relevant contextual information from SP 610. The set of applications can be obtained from SP 610, other VoIP clients, a third party SP 612, a central database server, or the like.

Based on the newly obtained information, SP 610 may determine whether more information needs to be obtained. SP 610 may identify another set of applications for collecting more information. For example, SP 610 may identify an additional set of applications relating to user interfaces which is adaptive to the user interactions and/or other contextual information obtained from third party SP 612, and the like. SP 610 may transmit another set of applications (in the form of provider contextual information) or instructions to invoke such applications on the device. Alternatively, SP 610 may transmit source information where another set of applications can be obtained. Subsequently, the additional user interfaces may be provided to VoIP Client 606. SP 610 generates integrated contextual information by combing obtained contextual information, additional information, etc., before transmitting the contextual information. As mentioned above, SP 610 may identify part of the current contextual information to be removed before transmitting the contextual information and then update the received contextual information accordingly. SP 610 determines a routed destination based on the contextual information, the additional information, the detailed information, and the like. Upon determining the routed destination, SP 610 may generate tailored contextual information based on a need of the determined destination. In an illustrative embodiment, Destination 614 may be determined as a routed destination. In this embodiment, SP 610 may route the call-initiation signal and the tailored contextual information to Destination 614. Alternatively, SP 610 transmits the collected contextual information to another service provider which will eventually determine an appropriate destination party who can provide the desired service or a receiving party for the call initiation request. Another service provider of VoIP client 610 may forward the received contextual information to an appropriate destination party (a routed destination), which may collect more contextual information, if necessary, and update the received contextual information by adding, deleting, and/or modifying information.

In one embodiment, the structured hierarchies may be defined by Extensible Markup Language (XML). However, it is to be appreciated that the structured hierarchies can be defined by any language suitable for implementing and maintaining extensible structured hierarchies. Generally described, XML is well known as a cross-platform, software and hardware independent tool for transmitting information. Further, XML maintains its data as a hierarchically structured tree of nodes, each node comprising a tag that may contain descriptive attributes. XML is also well known for its ability to allow extendable (i.e. vendor customizable) patterns that may be dictated by the underlying data being described without losing interoperability. Typically, an XML namespace URI is provided to uniquely identify a namespace. In some instances, the namespace may be used as a pointer to a centralized location containing default information (e.g. XML Schema) about the document type the XML is describing.

In accordance with an illustrative embodiment, while the communication channel is being established, VoIP Client 606 may identify an XML namespace for contextual information. When multiple contexts are aggregated, appropriate XML namespaces can be declared as an attribute at the corresponding tags. It is to be understood that XML namespaces, attributes, and classes illustrated herein are provided merely as an example of structured hierarchies used in conjunction with various embodiments of the present invention. After Destination 614 and SP 610 receive the XML namespace information, the VoIP Client 606 transmits a set of contextual data packets, defined in accordance with the identified XML namespace, to Destination 614. When a namespace is present at a tag, its child elements share the same namespace in pursuant to the XML scope rule defined by XML 1.0 specification. As such, Destination 614 and VoIP Client 606 can transmit contextual information without including prefixes in all the child elements, thereby reducing the amount of data packets transmitted for the contextual information.

Figure 8A:
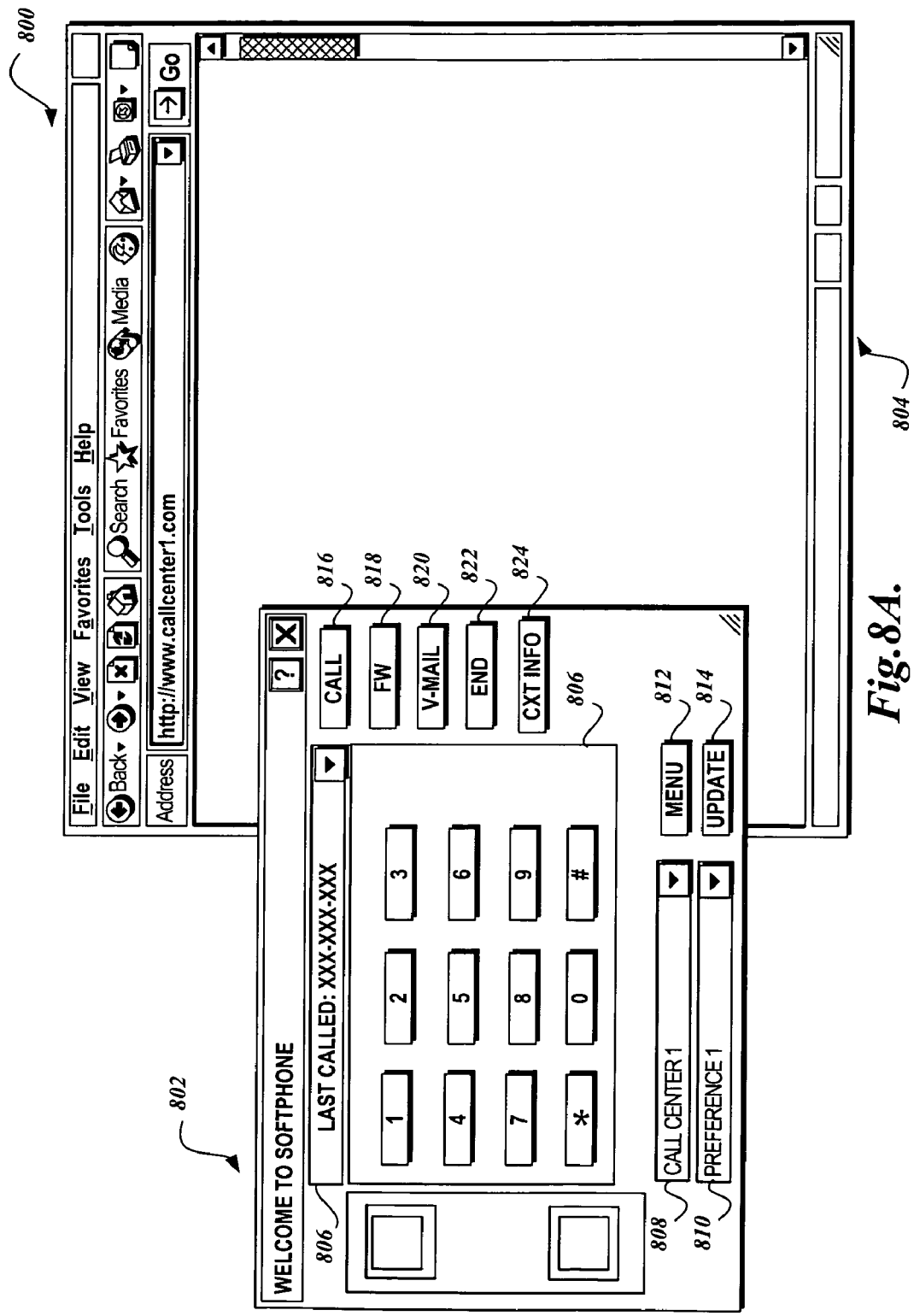
FIGS. 8A-8C are block diagrams illustrating exemplary user interfaces in accordance with an aspect of the present invention.
Figure 8B:
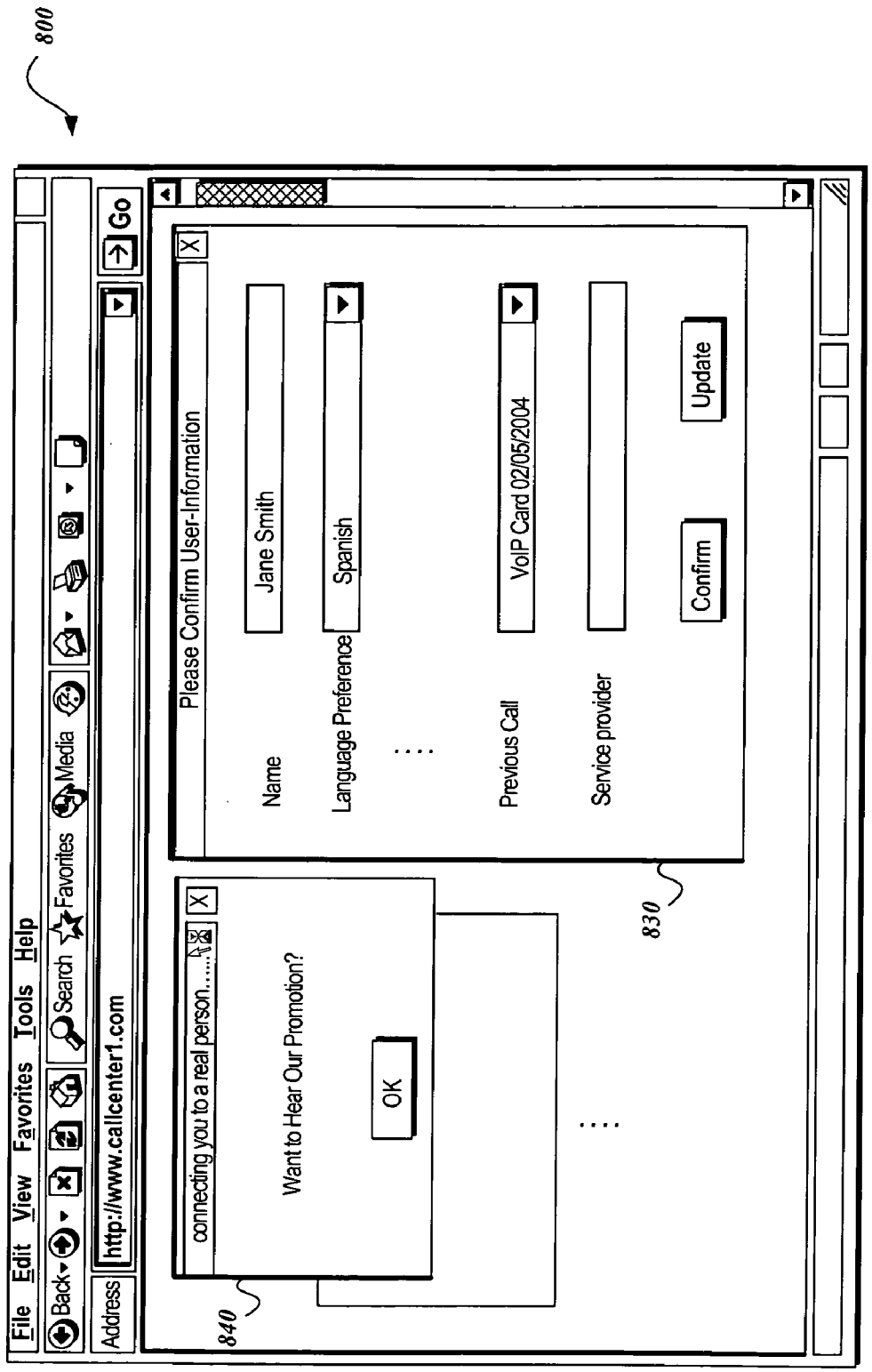
Figure 8C:
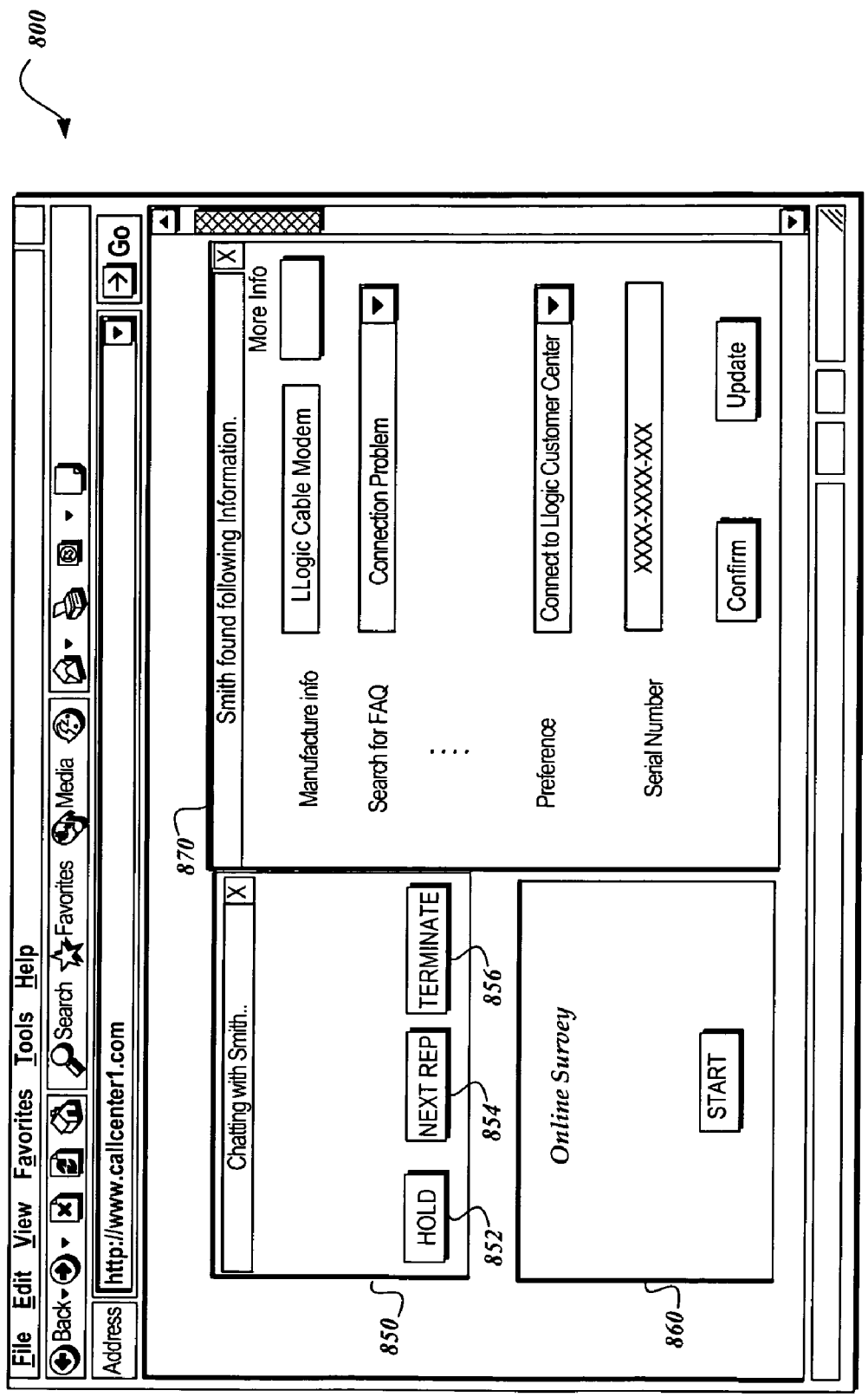

FIGS. 8A-8C are block diagrams illustrating user interfaces 800 in accordance with an exemplary embodiment of the present invention. For discussion purposes, assume that a client sends a signal to initiate a call to a call center, for reporting problems in a device, utilizing a VoIP device (e.g., computer, etc.) suitable for exchanging VoIP conversations. With reference to FIG. 8A, a block diagram illustrates user interfaces 800 initially displayed on a screen of the VoIP device when a client initiates a call connection by sending an initiation signal. In a particular embodiment, an individual user or a client may have launched an Internet Phone User Interface 802 in order to send a signal to initiate a call. It is contemplated that appropriate software and application components relating to VoIP conversations are readily resident on the VoIP device.

In an illustrative embodiment, the Internet Phone User Interface 802 may include various buttons and sub-screens to assist a user in making a VoIP call connection. For example, the Internet Phone User Interface 802 may include a keypad 804 similar to a keypad of a conventional telephony device. The Internet Phone User Interface 802 may include several selection menus 806, 808, 810 allowing the user to select last call number, a number from an address book (e.g., CALL CENTER 1), desired user preferences, and the like. MENU 812 and UPDATE 814 buttons may be utilized to change and/or view the selection menus 806, 808, 810.

In one embodiment, other functional buttons 816, 818, 820, 824 may provide shortcuts for frequently used VoIP call features. For example, when CXT INFO 824 button is selected, a set of contextual information (prepackaged contextual information, information collected by the VoIP device, etc.) may be transmitted without receiving any requests for such contextual information. Additionally, in an illustrative embodiment, a main user interface 804 relating to the service provider may be provided, which may be a known Web page of the service provider, a previously obtained user interface (relating to past services), applications pushed by the service provider upon receipt of the request, or the like. In this embodiment, during a connection set-up phase, the service provider may receive a request for a service (e.g., a call connection request to the 800 number of a particular call center) from a client and subsequently receive the client's contextual information. Based on the request and the client contextual information, the service provider may determine whether additional information needs to be obtained from the client. In one embodiment, when the client does not wish to send any contextual information or does not have capabilities to collect or transmit contextual information, any client contextual information (which is associated with the communication channel) may not be received. In this embodiment, the service provider may have a predefined default destination for the calls for which the service provider cannot determine an appropriate destination. Alternatively, the service provider may collect and/or obtain the contextual information relating to the client from proper sources, such as its local storage, other service providers, other clients, third party service providers, etc.

Referring to FIG. 8B, during the connection set-up phase, more information can be collected via user interactions on several user interfaces 830, 840. As mentioned above, the service provider's contextual information relating to the set of applications may be provided to the client. Alternatively, a device of the client may have previously obtained applications relating to the user interfaces suitable for providing desired user interactions. In this manner, the appropriate user information (e.g., client contextual information) collected before the call-initiation signal and the relevant user information is routed to an appropriate destination (e.g., an operator, an agent, a primary contact, an interactive voice response system (IVRS), a call distributing system, a third-party service provider, and the like). For example, an agent at a call center can receive appropriate information relating to the requested services such as client information, previous history of services, possible solutions, next level of support, and the like. It is contemplated that the exchange of contextual information can be done at any time during a conversation. In one embodiment, in order to improve network bandwidth, a prolonged period of silence (no exchange of voice data packets for a threshold time) may be detected and utilized for exchange of contextual information.

Referring to FIG. 8C, after the communication channel connection is established with the routed destination, the routed destination, the service provider, and the like can collect more information from the client. While the client communicates with the routed destination, media information and contextual information may be exchanged via various user interfaces. In one embodiment, several sub-screens may be populated, including a sub-screen 850 for an on-line survey, a sub-screen 830 for collecting more contextual information, a sub-screen 840 for the communication channel, and the like. For example, the sub-screen 840 for the communication channel may display who is communicating and provide selection buttons 842, 844, 846 for the individual user to choose from in order to control the communication channel connection. For example, the user can select HOLD 842 button to hold, interrupt, or mute the conversation. NEXT REP 844 button may allow the user to alter the communication channel connection by selecting the next available destination. The user can select TERMINATE 846 button which terminates the communication channel connection.

With reference to FIGS. 9A-9F, block diagrams illustrative of various classes and attributes of structured hierarchies corresponding to VoIP contextual information are shown. The contextual information exchanged between various VoIP entities (e.g., clients, service providers, etc.) may correspond to a VoIP namespace 900. In one embodiment, the VoIP namespace 900 is represented as a hierarchically structured tree of nodes, each node corresponding to a subclass which corresponds to a subset of VoIP contextual information. For example, a VoIP Namespace 900 may be defined as a hierarchically structured tree comprising a Call Basics Class 902, a Call Contexts Class 910, a Device Type Class 920, a VoIP Client Class 930, and the like.

Figure 9A:
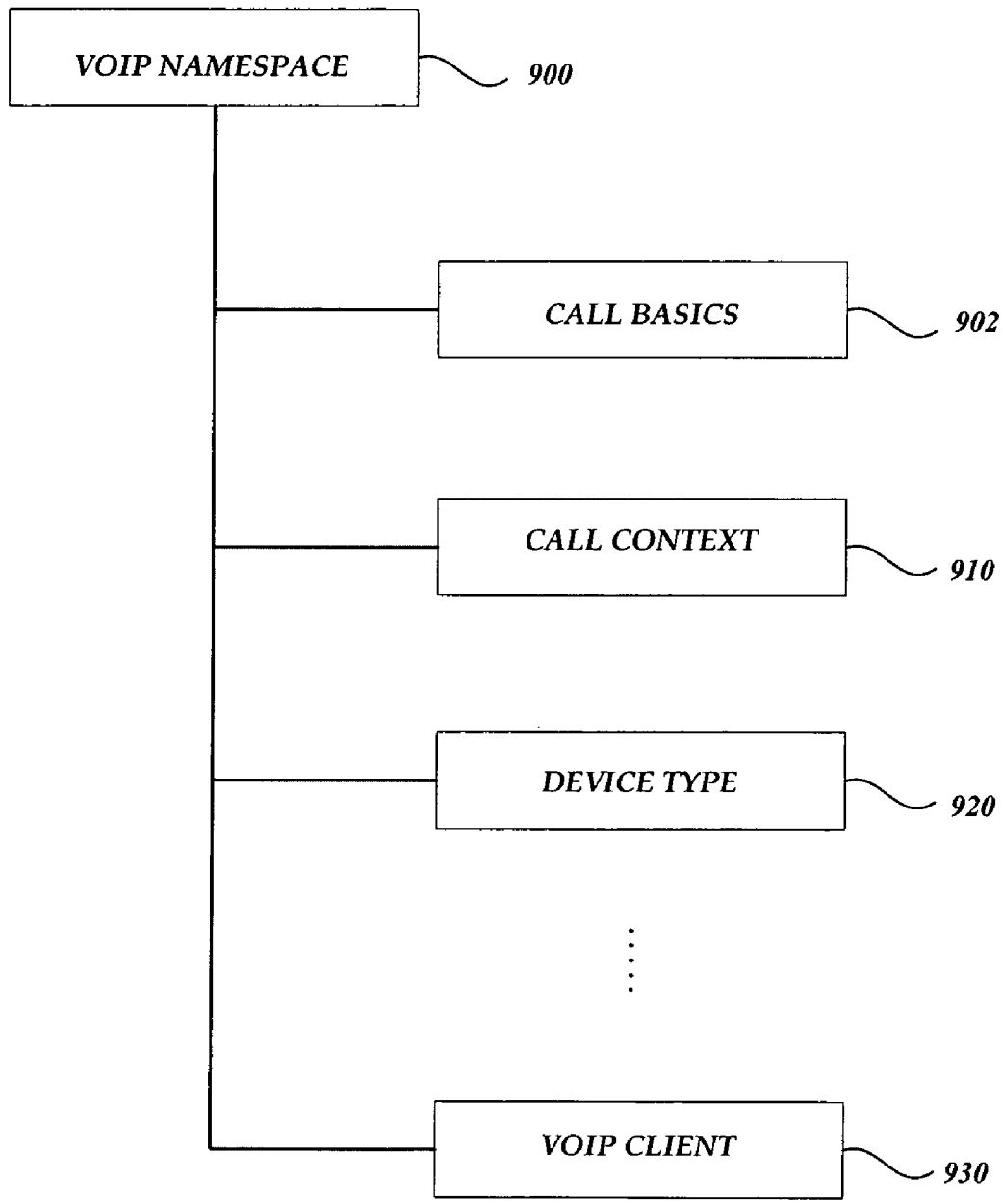
FIG. 9A is a block diagram illustrative of various attributes and classes of structural hierarchies corresponding to VoIP contextual information in accordance with an aspect of the present invention.
Figure 9B:
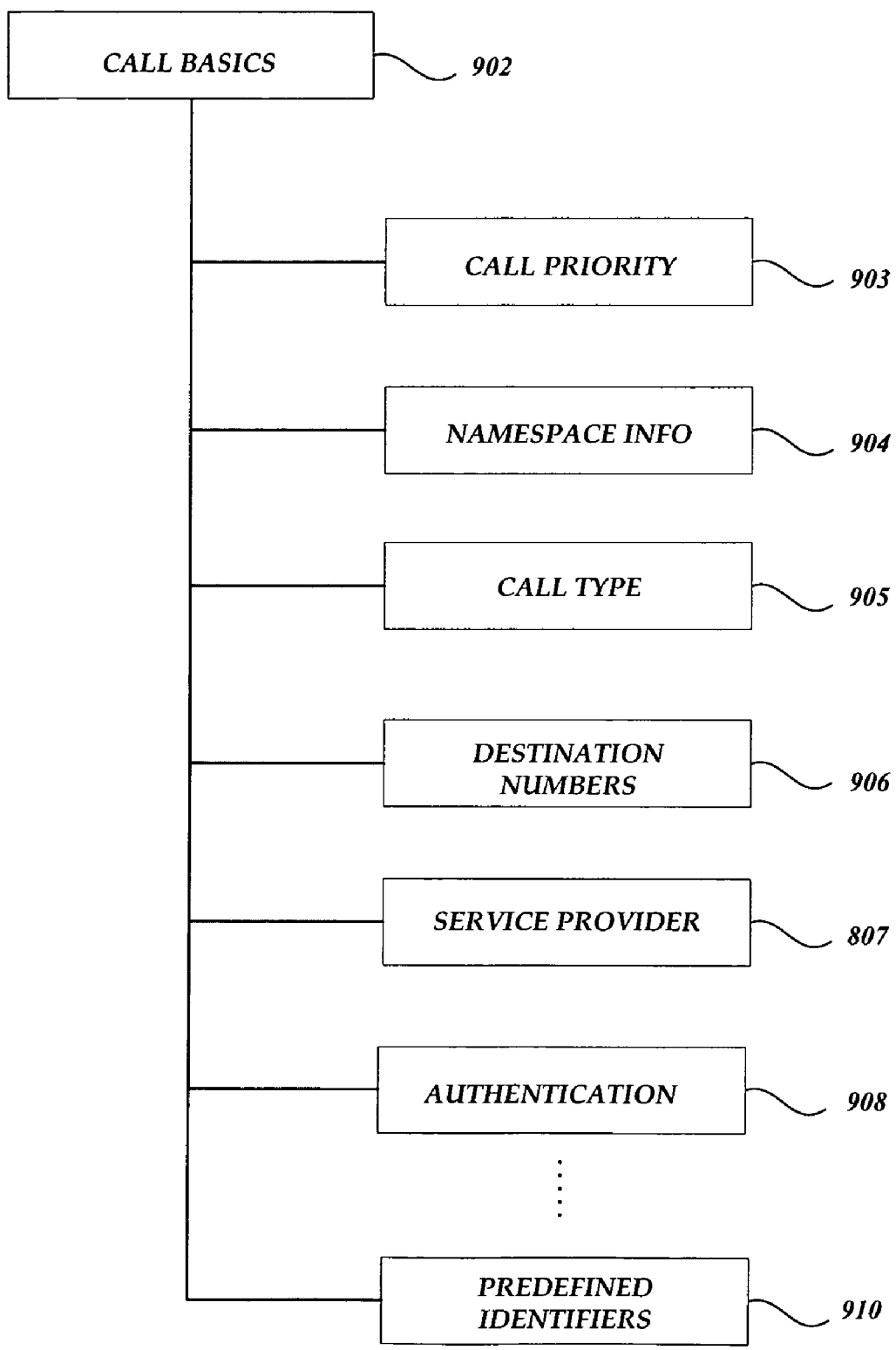
FIG. 9B is a block diagram of a call basic class which is an exemplary subset of the structural hierarchies illustrated in FIG. 9A.

With reference to FIG. 9B, a block diagram of a Call Basics Class 902 is shown. In an illustrative embodiment, Call Basics Class 902 may correspond to a subset of VoIP contextual information relating to a conversation channel connection (e.g., a PSTN call connection, a VoIP call connection, and the like). The subset of the VoIP contextual information relating to a conversation channel connection may include originating numbers (e.g., a caller's client ID number), destination numbers (e.g., callees' client ID numbers or telephone numbers), call connection time, VoIP service provider related information, and/or ISP related information such as IP address, MAC address, namespace information, and the like. Additionally, the contextual information relating to a conversation channel connection may include call priority information (which defines the priority levels of the destination numbers), call type information, and the like. The call type information may indicate whether the conversation channel is established for an emergency communication, a broadcasting communication, a computer to computer communication, a computer to POTS device communication, and so forth. In one embodiment, the contextual information relating to a conversation channel connection may include predefined identifiers which represent emotions, sounds (e.g., "ah," "oops," "wow," etc.) and facial expressions in graphical symbols. In one embodiment, a Call Basics Class 902 may be defined as a sub-tree structure of a VoIP Namespace 900, which includes nodes such as call priority 903, namespace information 904, call type 905, destination numbers 906, service provider 907, predefined identifiers 908, and the like.

Figure 9C:
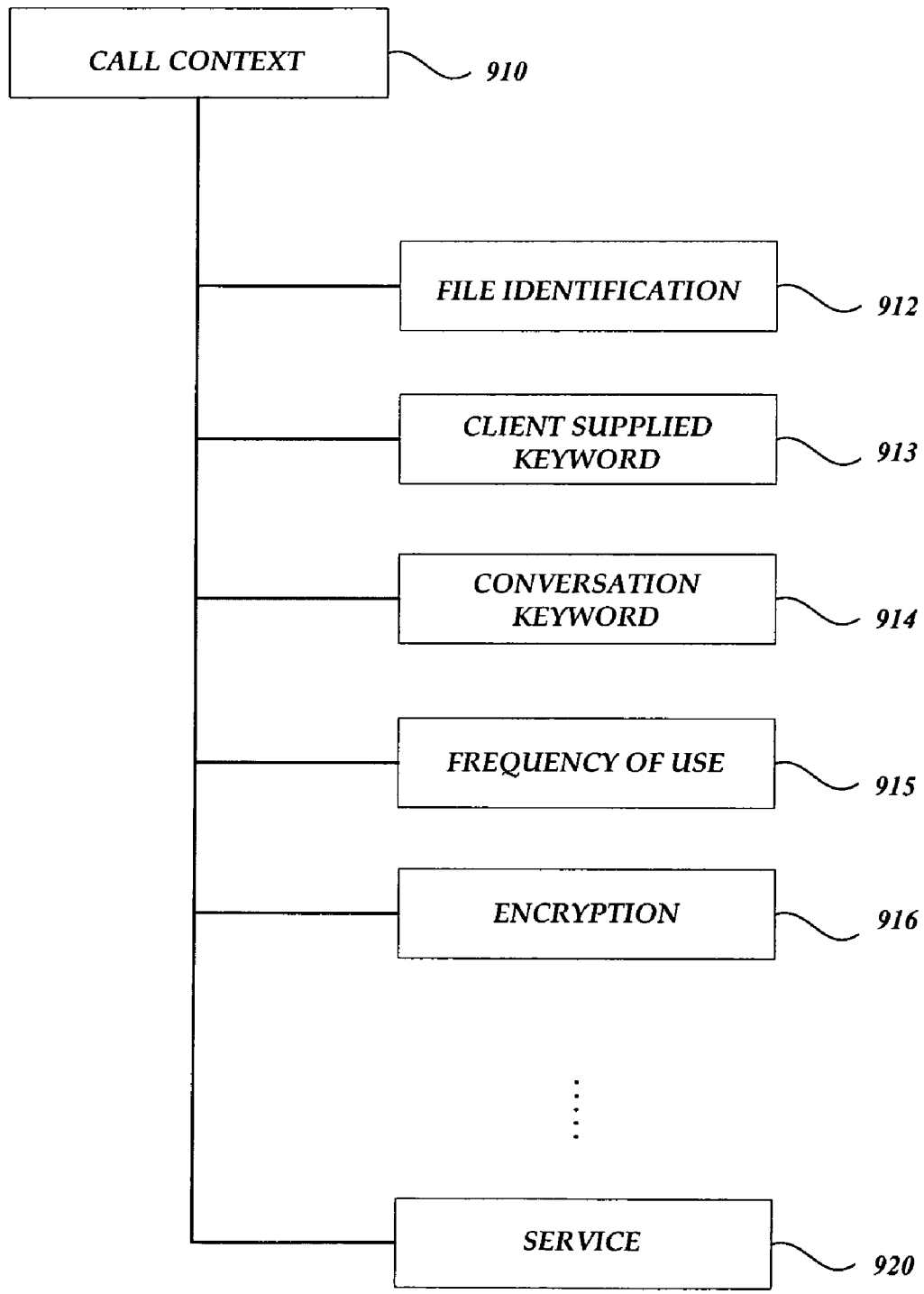
FIG. 9C is a block diagram of a call context class which is an exemplary subset of the structural hierarchies illustrated in FIG. 9A.
Figure 9D:
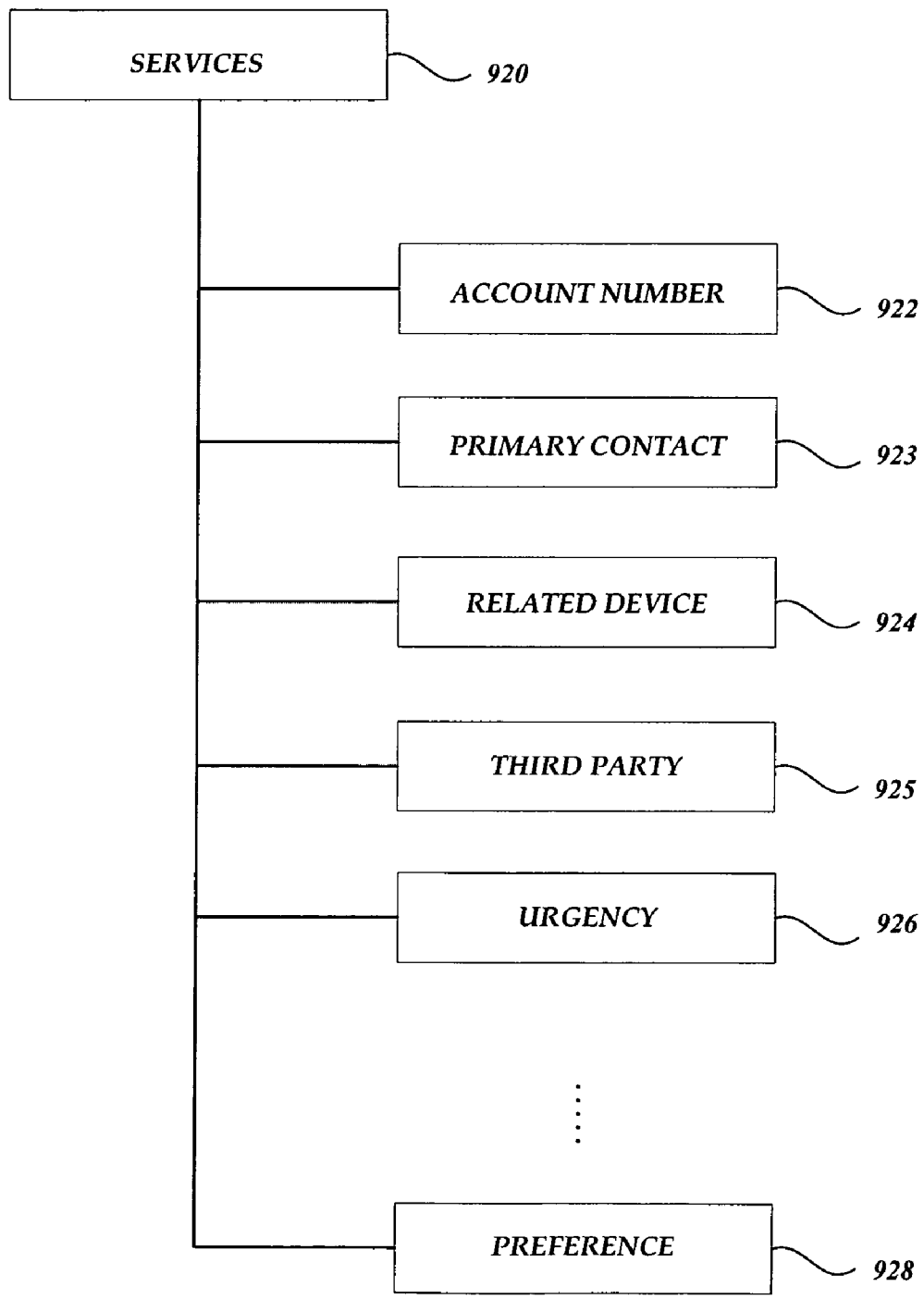
FIG. 9D is a block diagram of a services subclass which is an exemplary subset of the structural hierarchies illustrated in FIG. 9C.

With reference to FIGS. 9C and 9D, block diagrams of a Call Contexts Class 910 and one subclass of the Call Contexts Class 910 are shown. In one embodiment, a subset of VoIP contextual information relating to conversation context may correspond to the Call Contexts Class 910. The contextual information relating to conversation context may include information such as keywords supplied from a client, a service provider, or a network, identified keywords from document file data, identified keywords from a conversation data packet (e.g., conversation keywords), file names for documents and/or multimedia files exchanged as part of the conversation, game related information (such as a game type, virtual proximity in a certain game), frequency of use (including frequency and duration of calls relating to a certain file, a certain subject, and a certain client), and file identification (such as a case number, a matter number, and the like relating to a conversation). Additionally, the contextual information relating to conversation context may include information relating to encryption (e.g., whether and/or how to encrypt contextual information, the type of encryption such as asymmetric/symmetric or bit strength, etc.) and subject of service (a type or nature of the service when a client requests such service from a service provider), among many others. In accordance with an illustrative embodiment, a Call Contexts Class 910 may be defined as a sub-tree structure of a VoIP Namespace 900, which includes nodes corresponding to file identification 912, supplied keyword 913, conversation keyword 814, frequency of use 915, encryption information 916, service 920, and the like.

Referring to FIG. 9D, a block diagram of a Services 920 subclass is shown. In one embodiment, the Services 920 subclass may correspond to a subset of information relating to a requested service. The contextual information relating to a requested service may include a client account number associated with the requested service. The client account number may be used as a key to search the database associated with the service provider. The database may be maintained by a third party server. In one embodiment, in a call center environment, a primary contact may be assigned to each client. For example, general clients may have a help desk operator as a default primary contact while an important client (e.g., vendors, high volume clients, etc.) may have a dedicated primary contact. Alternatively, an IVRS may be assigned as a default primary contact. Likewise, the last primary contact that has previously provided good service may be recorded as a primary contact.

The contextual information relating to a requested service may further include information relating to a device which requires the service (this may be the same as, or different from, a device currently used by the client in a communication channel). Third party SPs may be associated with a manufacturer of the device, or manufacturer of components of the device. Such third party SPs may have additional information crucial to providing the requested services. Further, the contextual information relating to a requested service may include a level of urgency which may be utilized, in conjunction with other information, to determine a priority of the requested service. The client may specify preferences or rules related to the requested services. For example, the client may specify a language preference, a time threshold that the client is willing to wait for the service, and the like. In accordance with an illustrative embodiment, a Services Subclass 920 may be defined as a sub-tree structure of a Call Contexts Class 910, which includes nodes corresponding to account number 922, primary contact 923, related devices 924, third party 925, urgency 926, preference 928, and the like.

Figure 9E:
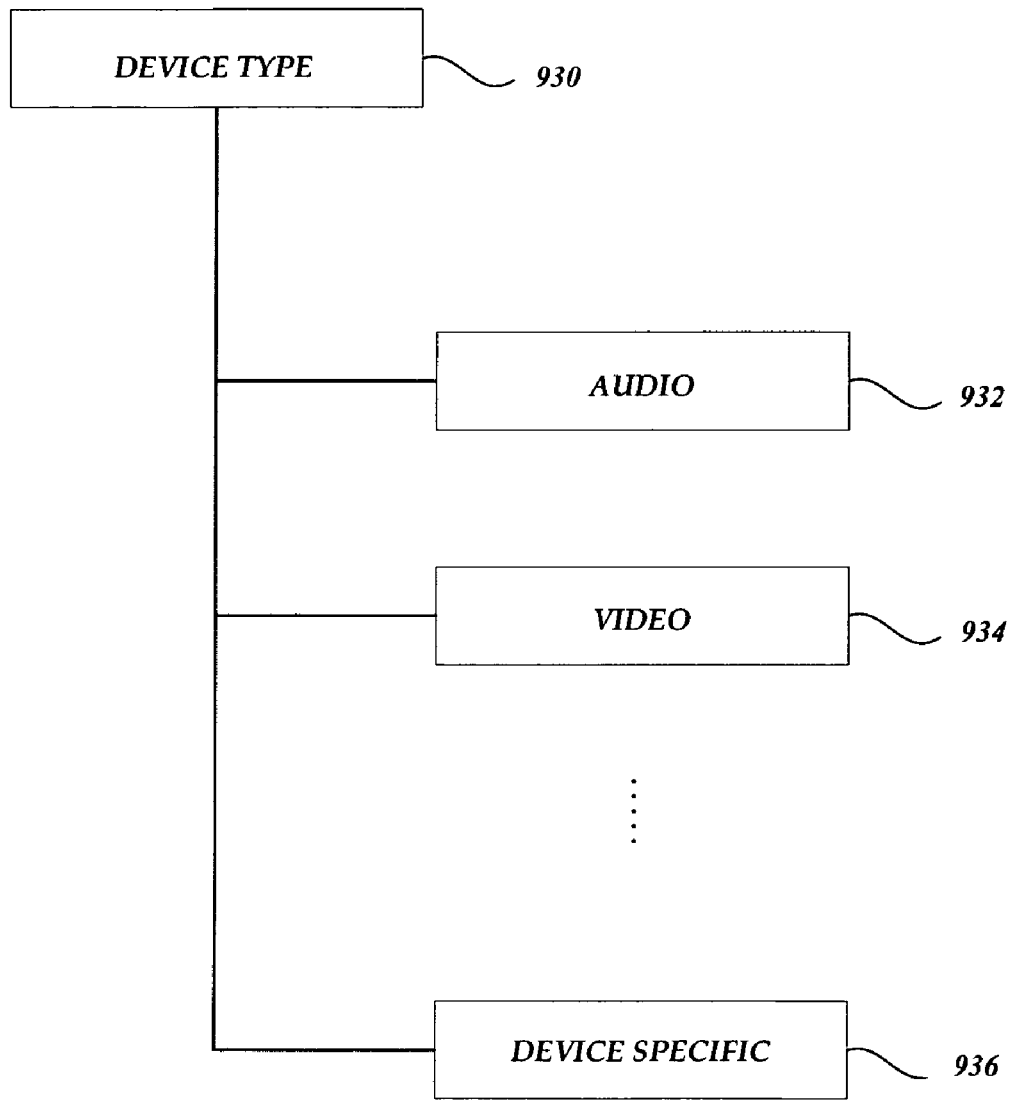
FIG. 9E is a block diagram of a device type class which is an exemplary subset of the structural hierarchies illustrated in FIG. 9A.

With reference to FIG. 9E, a block diagram of a Device Type Class 930 is depicted. In one embodiment, a Device Type Class 930 may correspond to a subset of VoIP contextual information relating to a VoIP client device used for the conversation channel connection. The subset of the VoIP contextual information relating to the VoIP client device may include audio related information which may be needed to process audio data generated by the VoIP client device. The audio related information may include information related to the device's audio functionality and capability, such as sampling rate, machine type, output/input type, microphone, Digital Signal Processing (DSP) card information, and the like. The subset of the VoIP contextual information relating to the VoIP client device may include video related information which may be needed to process video data generated by the VoIP client device. The video related information may include resolution, refresh, type and size of the video data, graphic card information, and the like. The contextual information relating to VoIP client devices may further include other device specific information such as type of the computer system, processor information, network bandwidth, wireless/wired connection, portability of the computer system, processing settings of the computer system, and the like. In an illustrative embodiment, a Device Type Class 930 may be defined as a sub-tree structure of a VoIP Namespace 800, which includes nodes corresponding to Audio 932, Video 934, Text 935, Device Specific 936, and the like.

Figure 9F:
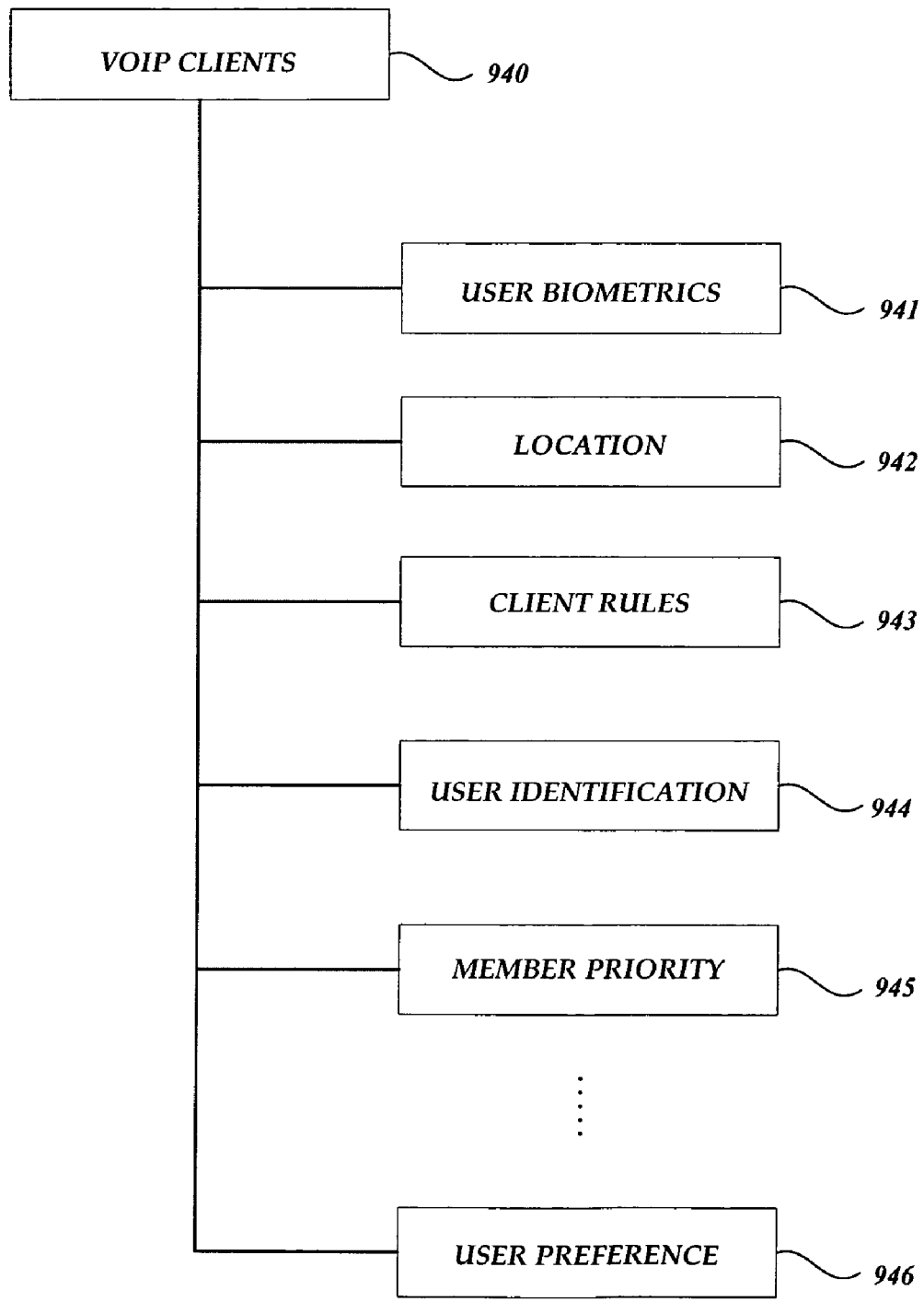
FIG. 9F is a block diagram of a VoIP clients class which is an exemplary subset of the structural hierarchies illustrated in FIG. 9A.

FIG. 9F depicts a block diagram of a VoIP Client Class 940. In accordance with an illustrative embodiment, a VoIP Client Class 940 may correspond to a subset of contextual information relating to VoIP clients. In one embodiment, the subset of the VoIP contextual information relating to the VoIP client may include voice profile information (e.g., a collection of information specifying the tonal and phonetic characteristics of an individual user), digital signature information, and biometric information. The biometric information can include user identification information (e.g., fingerprint) related to biometric authentication, user stress level, user mood, etc. The subset of the VoIP contextual information relating to the VoIP client may include assigned phone number, user contact information (such as name, address, company, and the like), rules defined by the client, user preferences, digital rights management (DRM), a member rank of an individual user in an organization, priority associated with the member rank, and the like. The priority associated with the member rank may be used to assign priority to the client for a conference call. As will be described in greater detail below, the subset of the VoIP contextual information relating to the VoIP client may include location information. In one embodiment, a Client Class 940 may be defined as a sub-tree structure of a VoIP Namespace 900, which includes nodes corresponding to user biometrics 941, user preference 942, rules 943, user identification 944, member priority 945, location 946, and the like.

Figure 10:
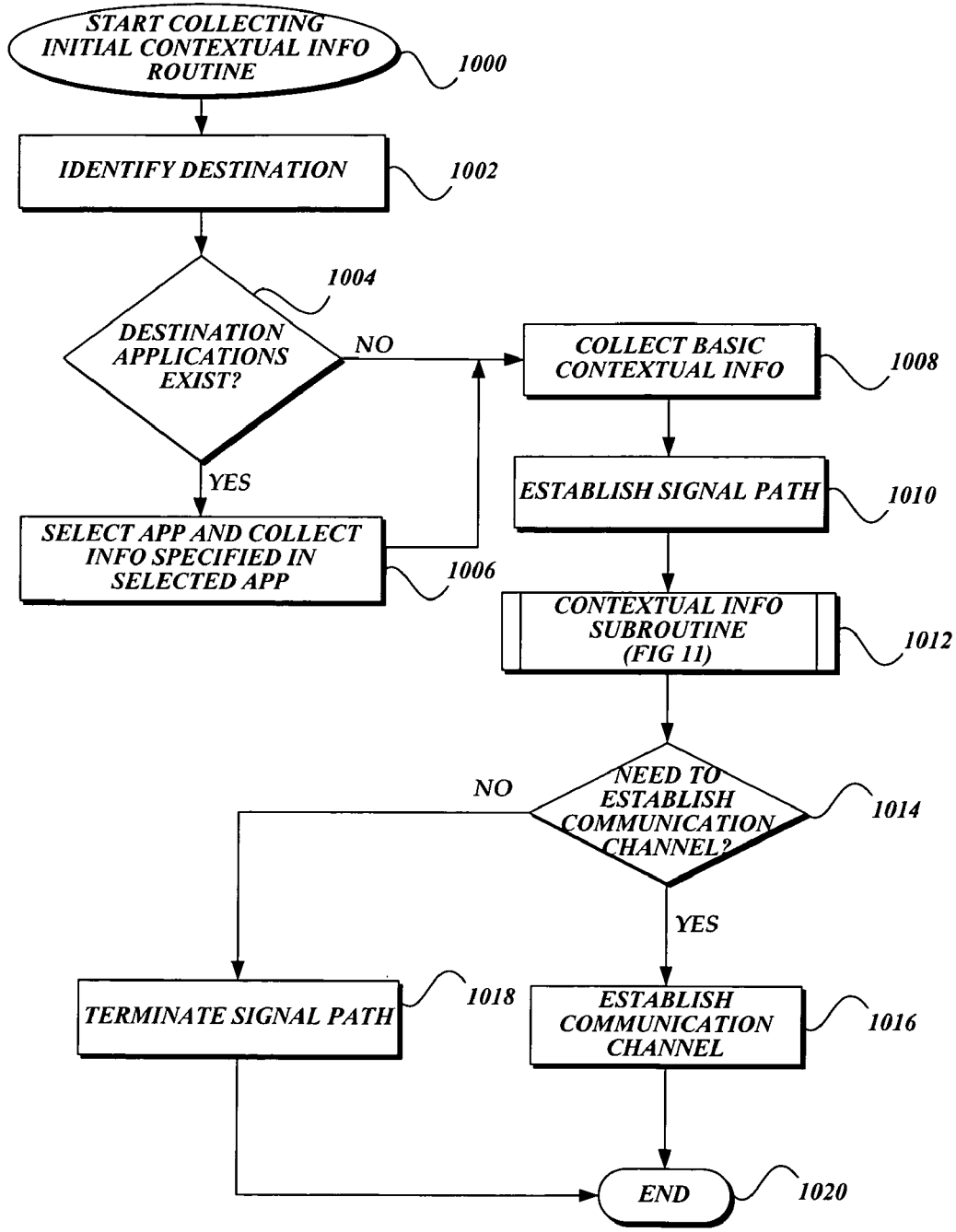
FIG. 10 is a flow diagram illustrating a routine for collecting initial contextual information in accordance with an aspect of the present invention.

FIG. 10 is a flow diagram illustrating a routine 1000 for collecting and/or obtaining initial contextual information relating to a communication channel in accordance with an embodiment of the present invention. For the purpose of discussion, assume that a device of a calling VoIP client (calling client) may be associated with several service providers for receiving services. In addition, appropriate software and application components relating to VoIP conversations are readily resident on the device. The calling client may be capable of identifying the destination service provider based on previously obtained information, for example a service contract, a warrantee, or the like. Further, the destination service provider may be determined based on a desired service, a detected problem, etc. The calling client transmits a service request to the destination service provider by transmitting a signal to initiate a call with one of the contacts (e.g., an operator, an agent, an IVRS, etc.) representing the destination service provider.

Although the illustrative embodiment is described in connection with the routine 1000 and focused on collecting contextual information by the device of the calling client during a connection set-up phase, it is contemplated that contextual information can be collected and/or obtained by a service provider, or a third party service provider, at any time (including before, during, or after terminating a communication channel). It is also contemplated that any suitable VoIP entities can be a source where the calling client can obtain contextual information.

Beginning at block 1002, the calling client may identify a destination service provider (e.g., a call center, a service provider, etc.) for requesting services based on previously obtained information stored in local storage. Alternatively, the destination service provider related information may be obtained from a management server with a central database which maintains device related information such as a device serial number, a firmware version, purchase information, a call center phone number, a web address of the call center, or the like. Based on various types of information, the destination service provider for requesting services may be determined.

In one embodiment, a device may be capable of initiating an automatic call to a designated destination service provider if the device is experiencing a certain problem corresponding to the designated destination. In this example, the destination service provider is predefined based on a potential problem on the device. At decision block 1004, a determination is made as to whether a set of applications relating to the identified destination is locally available. One example of the set of applications may be structured hierarchies. As described above, based on the content of the contextual information, at least one structured hierarchy may be identified from predefined structured hierarchies, such as an XML namespace, and the like.

In one embodiment, minimum predefined structured hierarchies can be agreed among VoIP entities. Subsequently, any additional structured hierarchies needed for the communication of contextual information will be exchanged among VoIP entities before the corresponding contextual information is transmitted. If it is determined at decision block 1004 that the set of applications is locally available, at block 1006, an appropriate application may be selected and a set of contextual information may be collected in accordance with the selected applications. If it is determined at decision block 1004 that the set of applications is not available, at block 1008, basic contextual information may be collected. In one embodiment, the calling client may send a query for the appropriate applications to a proper source including the call center, a third party service provider or the like. In another embodiment the calling client may receive applications via a dedicated device while no media information is exchanged.

For example, the applications may be updated periodically. In another embodiment, the calling client may have old versions of applications. In this example, the calling client may send the version number of the applications to the destination service provider to confirm the compatibility of the two different versions of applications. In response to this, the destination service provider may send additional information to upgrade the applications resident in the device of the client. Further, the destination service provider may send a confirmation of the compatibility or identify a source to get the updated application, or the like. At block 1010, a signal path between the calling client and the identified destination service provider is established. In one embodiment, the calling client may send a call-initiation signal to the identified destination service provider. Upon receipt of the call-initiation signal, the call center may send a response to the call-initiation signal. The response may be an acceptance of the call-initiation signal, a rejection of the call-initiation signal, etc. Over the signal path, the calling client and the identified destination service provider may exchange contextual information. For example, the call initiation signal may be related to a service request and its corresponding information is readily available on the destination service provider before the conversation begins between the calling client and the call center. The identified destination service provider may send the information corresponding to the service request, a request for additional information, a request for other relevant contextual information, or the like. The calling client may collect and provide requested contextual information. At block 1012, contextual information may be exchanged via a contextual information subroutine which will be discussed in greater detail below in FIG. 11. At decision block 1014, a determination is made as to whether a communication channel needs to be established between the calling client and the destination service provider. For example, if the query of the calling client (a service request, an inquiry for information, and the like) has been satisfied by exchanging contextual information, the communication channel does not need to be established. In one embodiment, a contact point (e.g., user, automated system, etc.) of the device may be asked whether the contact point has received adequate information or services which the call initiation intended to receive. For example, a user interface may be populated to get the calling client's answer as to whether the query is satisfied, the furtherance of a communication channel establishment is desired, or additional services are desired, and the like.

If it is determined at decision block 1014 that the communication channel needs to be established since all the queries (desired services, inquiries for information, etc.) of the calling client have not been satisfied, at block 1016 the communication channel will be established. If it is determined at decision block 1014 the communication channel does not need to be established since all the queries have been satisfied at block 1018, the signal path will be terminated. The routine 1000 completes at block 1020 after establishing a communication channel (block 1016) or terminating the signal path (block 1018).

It is to be understood that the embodiments explained in conjunction with the routine 1000 are provided merely for example purposes. In one embodiment, a VoIP device may send an automatic service request upon detection of problems without any human interaction. It is contemplated that the routine 1000 can also be performed by a service provider or a third party service provider. For example, a service provider can collect contextual information relating to a communication channel and request additional information from the calling client, devices of the calling client, or a third party service provider. It is further contemplated that a service provider can forward the call-initiation signal and contextual information to a third party service provider which is suitable to route the incoming signal (call-initiation signal) to the destination service provider.

Figure 11:
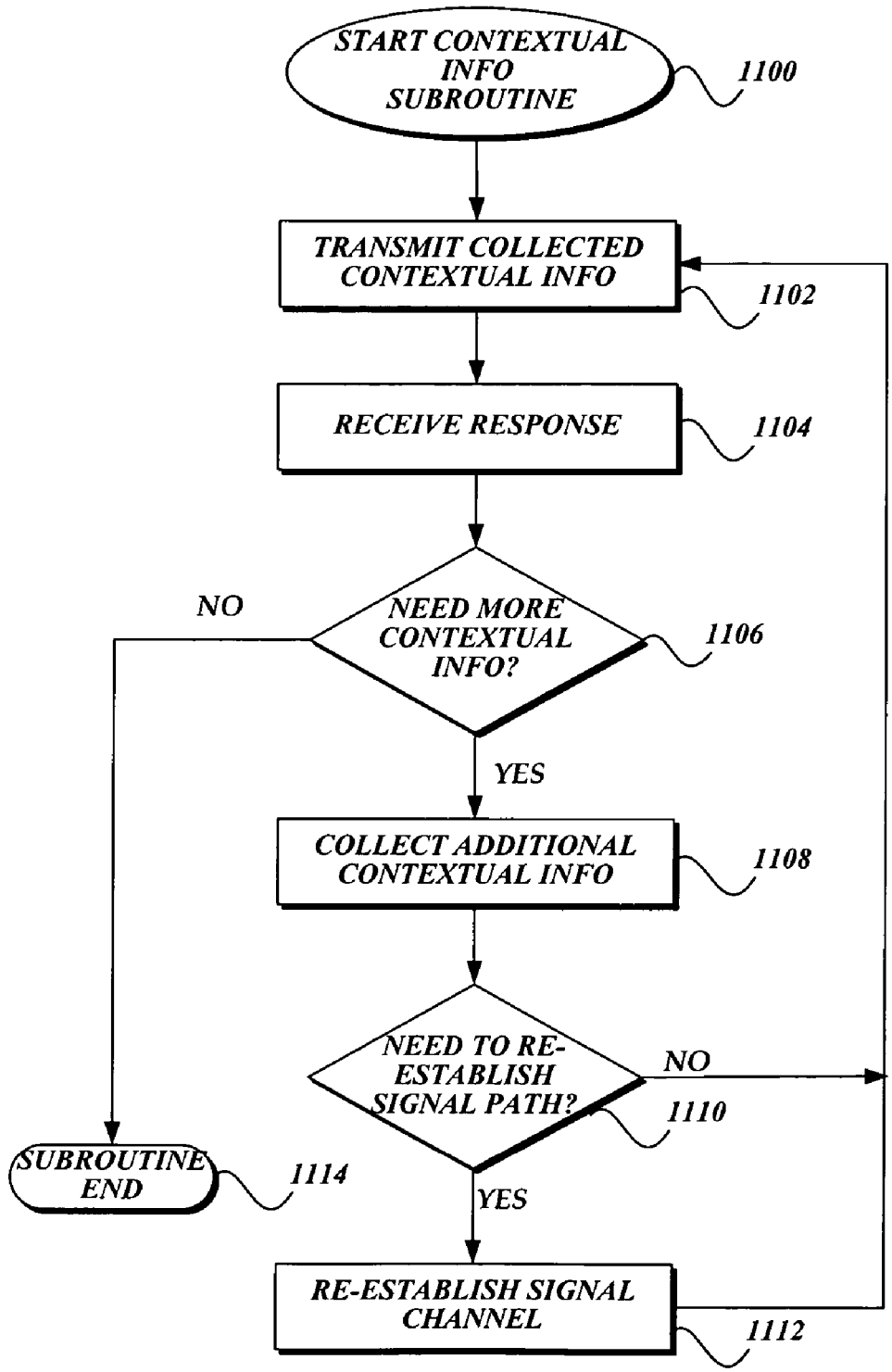
FIG. 11 is a flow diagram illustrating a contextual information subroutine suitable for use in the routine illustrated in FIG. 10.

FIG. 11 is a flow diagram of a subroutine 1100 for collecting and transmitting contextual information over a signal path in accordance with an embodiment of the present invention. As with FIG. 10, the calling client may have a signal path established with a destination service provider and have collected basic contextual information. At block 1102, the collected contextual information may be transmitted to the destination service provider over a signal path. Upon receipt of the contextual information, the call center may send a response based on the contextual information. At block 1104, the response to the contextual information may be received. The response may be a request for additional information, a request for other relevant contextual information, or the like. Further, the response may be information related to providing the requested service. For example, a call initiation signal may be related to a service request and its corresponding information is readily available on the destination service provider before the conversation begins between the calling client and the destination service provider (e.g., a call center). Upon receipt of the contextual information, the destination service provider may collect detailed information, which can be a potential answer for a query associated with the call and then transmit the collected information. At decision block 1106, a determination is made as to whether additional information needs to be collected based on the response. If the additional contextual information needs to be collected, at block 1108, the additional contextual information may be collected.

In one embodiment, the calling client may identify additional contextual information which needs to be collected for the communication channel. An appropriate source for collecting additional contextual information may be determined. It is contemplated that any entities such as other clients, a third party service provider other service providers, and the like can be an appropriate source for the contextual information. If necessary, the calling client may contact the appropriate source and collect the additional contextual information. In one embodiment, the calling client may send an inquiry for obtaining the additional contextual information to the appropriate source (e.g., third party service provider). It is further contemplated that the calling client may utilize other suitable devices to collect the information if the device currently in use does not have the functionality to contact or collect such information. The information collected by other devices may be forwarded to the device which is currently in use.

At decision block 1110, a determination is made as to whether the signal path predetermined time period. If it is determined at decision block 1110 that the signal path needs to be established due to expiration, at block 1112, the signal path will be re-established between the calling client and the service provider. After re-establishing the signal path (block 1112) or if it is determined that the signal path does not need to be established (decision block 1110), the routine will repeat the above mentioned steps until no more contextual information need to be collected or transmitted. If it is determined at decision block 1106 that no more contextual information needs to be collected or transmitted, the subroutine terminates at block 1114.

Figure 12:
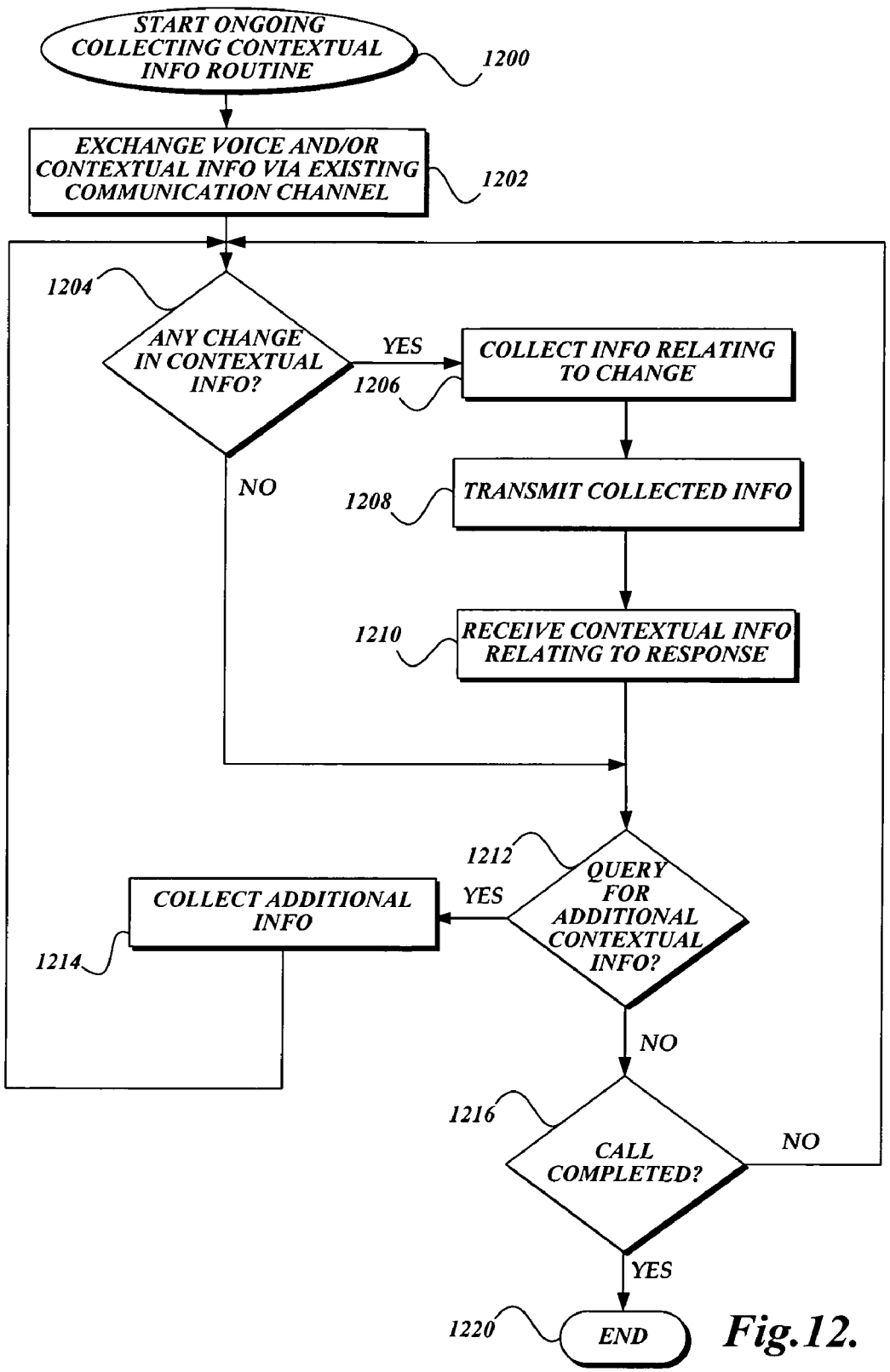
FIG. 12 is a flow diagram illustrating a routine for an ongoing collection of contextual information over an existing communication channel.

FIG. 12 illustrates a flow diagram of a routine 1200 for collecting contextual information during a conversation in accordance with an embodiment of the present invention. As described in FIG. 10, the initial contextual information may have been collected and transmitted to the destination service provider (call center) during the connection set-up time. For purpose of discussion, assume that a communication channel has been established between the calling client and the call center (e.g., a contact of the call center, an IVR, etc.).

Beginning at block 1202, after a communication channel is established, the call center and the calling client may continue exchanging contextual information and/or media information (including voice information) over the communication channel. At decision block 1204, a determination is made as to whether there are any changes in the contextual information. If it is determined at decision block 1204 that there is a change in the previously transmitted contextual information, at block 1206, additional information relating to the change may be collected and/or obtained from a proper source. For example, if the additional information is locally available, the additional information is retrieved. Otherwise, the additional information may be obtained from various sources (e.g., other devices of the calling client, service providers, a third party service provider, etc.).

At block 1208, the collected (obtained) contextual information may be transmitted to the call center. At block 1210, a response corresponding to the transmitted contextual information may be received from the call center. In one embodiment, during the conversation, the call center may identify another service necessary or useful to the calling client. In order to provide the identified service, the call center may further collect contextual information from various sources. This may be useful when the calling client does not know about the exact nature of available services, automatic service calls transmitted from a suitable VoIP device, and the like.

Upon receipt of the response, the calling client may not need to continue further conversation, if the initial inquiry for services has been satisfied. In one embodiment, even after the calling client's initial inquiry for services has been satisfied by the response from the call center, the calling client may desire to have further conversation with a contact, an agent, or a sale representative at the call center. Moreover, the calling client may desire to send more inquiries to the call center, and the like. A determination is made as to whether any query for additional information has been received. If any query for additional information has been received, the additional information corresponding to the query may be collected from a proper source. It is to be understood that a query for information can be a part of the response received, or part of subsequently received provider contextual information which request the additional information. Further, the calling client may determine a need for additional information based on the conversation and appropriate information may be identified and collected.

If it is determined at decision block 1204 that there is no change in contextual information, at decision block 1212, a determination is made as to whether any query for requesting additional information has been received. If it is determined at decision block 1212 that a query for additional information has been received, at block 1214, the additional information may be collected. In an illustrative embodiment, when there are multiple sources available for the additional information, the additional information may be collected and/or obtained from each of the multiple sources. Alternatively, the most appropriate source may be determined and contacted. The calling client may have predefined rules or logic to determine an appropriate source for particular information. For example, a GPS server may be one of the appropriate sources for geographic location information of a device equipped with GPS modules. If an individual user's mobile phone can provide the geographic location information of a mobile device, the device may be one of the appropriate sources. Similarly, if a VoIP client maintains geographic location information of devices in local storage, the VoIP client may be one of the appropriate sources. The routine 1200 repeats the above-mentioned steps which include collecting (block 1214), transmitting contextual information (block 1208), and receiving a response (block 1210) until there is no query for additional information.

If it is determined at decision block 1212 that no query for additional information has been received, at decision block 1216, another determination is made as to whether the ongoing contextual information routine 1200 should be ended. For example, it may be determined as to whether the call is completed at decision block 1216. If it is determined that the ongoing contextual information routine 1200 should be continued, at decision block 1212, the routine 1200 continues to decision block 1204 where a determination is made as to whether any changes have occurred in contextual information. The routine 1200 repeats the steps of collecting (block 1206), transmitting contextual information (block 1208), receiving a response (block 1210) and/or collecting additional contextual information (block 1214) until the call is completed. If it is determined at decision block 1212 that the ongoing contextual information routine 1200 should be ended, the routine 1200 terminates at block 1220.

It is to be understood that the embodiments explained in conjunction with the routine 1200 are provided merely for example purposes. In one embodiment, the method of collecting contextual information may also be evolving based on the obtained contextual information. For example, a user's good mood may become bad when an IVRS starts communicating to obtain the additional contextual information. The user's mood can be detected by recognizing cursing words, body heat, tone of voice, stress, and the like. Upon receipt of contextual information relating to the mood change, the service provider may ask whether the user prefers a human operator or a form (GUI) rather than an IVRS. The call center may collect contextual information in accordance with the user selection. Alternatively, the call center may provide a promotion (e.g., coupons, rewards, etc.) to boost the user's mood, or an explanation of the current situation such as a long downtime in waiting for a human operator and the like. It is contemplated that information can be obtained from various sources. For example, if it is determined that the additional contextual information can be available from the calling client, the call center may identify its contextual information which will be used to collect the additional information at the calling client's device. In this example, a set of applications for providing or invoking user interfaces may be identified based on the requested service. The call center's contextual information relating to the set of applications is transmitted to the calling client. As mentioned above, when the calling client already has a set of applications suitable for collecting the additional information, embedded instructions to invoke user interfaces may be transmitted to the calling client. Similarly, when the calling client does not have appropriate applications suitable for collecting the additional information, a set of applications for providing user interfaces may be transmitted to the calling client. The service provider collects the additional information from the calling client.

In an alternative embodiment, the calling client may not allow the call center (or the routed destination) to pull information from any devices of the calling client. In this embodiment, the call center may request the calling client to collect the additional information by identifying the set of applications on the calling client device. The calling client device, in return, collects and transmits the additional information detected while implementing the set of applications. In one embodiment, the additional information needs to be obtained from the third party SPs, the most appropriate third party SP for obtaining the additional information will be determined. In this embodiment, the call center may have predefined provider rules or logic to determine an appropriate source for particular information. Further, the calling client may have provided calling client rules or preferences with respect to determining an appropriate source for particular information. The additional information is obtained from the most appropriate third party SP. In an alternative embodiment, the service provider may obtain the additional information from various third party SPs and generate comprehensive information based on the obtained information.

It is contemplated that upon receipt of a service request, other contextual information, relating to providing such service, may be collected by various VoIP entities including a service provider, a device, a third party service provider, etc., and exchanged. It is also contemplated that any suitable VoIP entities other than the service provider can be responsive to the service request and can provide the requested service. In one embodiment, the requested service may be provided in such a way that the client would not know the service is provided from VoIP entities other than the service provider.

Figure 13:
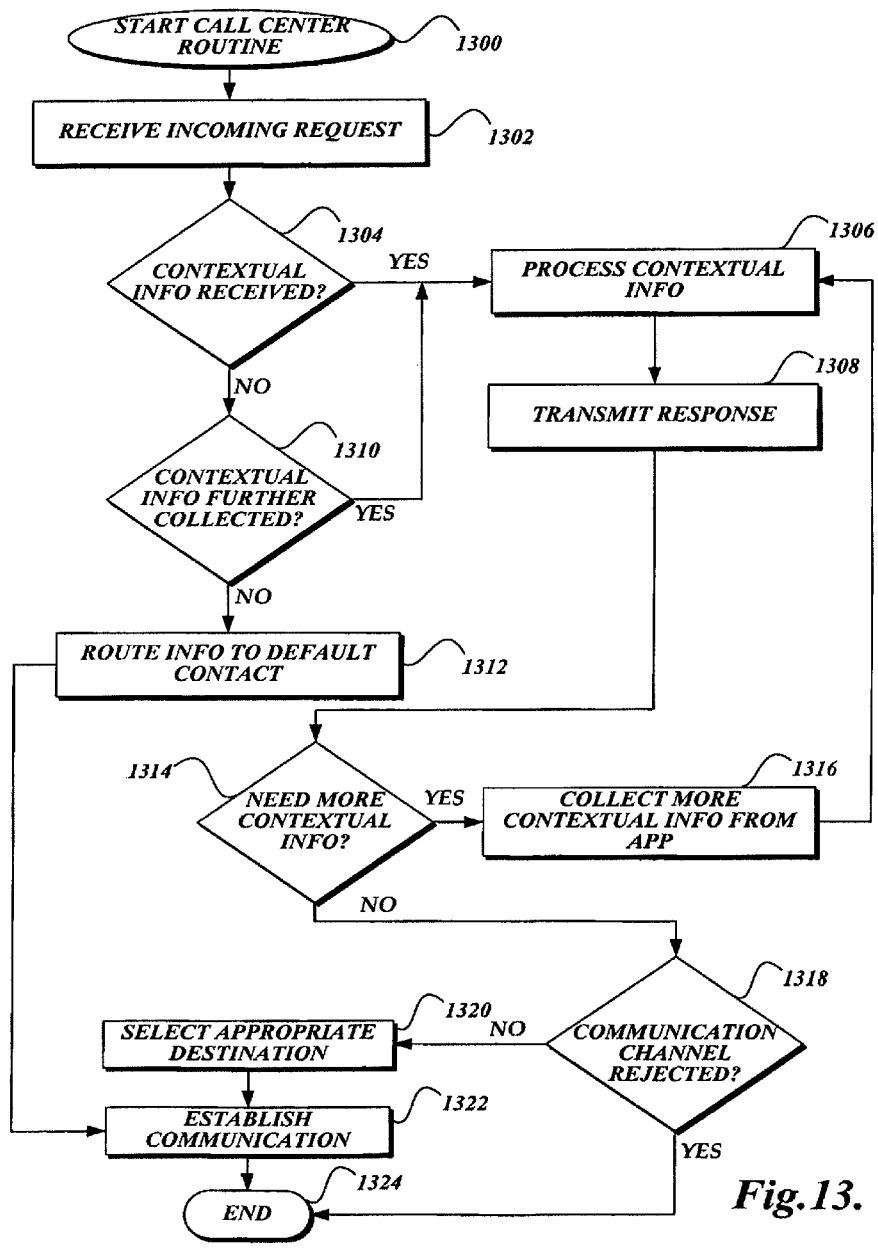
FIG. 13 is a flow diagram illustrating a routine for exchanging contextual information to route an incoming signal in accordance with an aspect of the present invention.

FIG. 13 is a flow diagram illustrating a routine 1300 for collecting contextual information and/or obtaining contextual information in response to an incoming request for a service, or in the course of providing the requested service with an embodiment of the present invention. As with FIG. 10, assume that a device of a calling client (a calling VoIP client) may be associated with a call center which is capable of providing customer services. Further assume that appropriate software and application components relating to VoIP conversations are readily resident on the device. The calling client transmits a service request to the service provider by transmitting a request to initiate a VoIP call communication with one of the contacts (e.g., an operator, an agent, an IVRS, etc.) representing the call center.

Beginning at block 1302, the call center receives an incoming request from the calling client. The incoming request may be a signal to initiate a communication channel with the one of contacts. At decision block 1304, a determination is made as to whether the calling client's contextual information relating to the communication channel has been received subsequent to the incoming request. In one embodiment, the device of the calling client may not have a functionality to collect or transmit contextual information, or the calling client may have a set of rules which prohibits any contextual information from being transmitted. In such a case, no contextual information associated with the communication channel may be received subsequent to the incoming request.

The call center may be authorized to collect the calling client's contextual information associated with the communication channel. If it is determined at decision block 1304 that no contextual information has been received, at decision block 1310, a determination is made as to whether contextual information of the calling client has been further collected. For example, if the device of the calling client does not have a functionality to collect or transmit contextual information, the contextual information of the calling client cannot be collected directly from the calling client. However, the call center can retrieve previously obtained (collected) contextual information of the calling client, or collect necessary information of the calling client from other sources which maintain the calling client's contextual information. If it is determined at decision block 1310 that the contextual information has been collected, or if it is determined at decision block 1304 that the contextual information has been received, the call center may process the contextual information of the calling client as illustrated at block 1306. Based on the processed contextual information and the incoming request, at block 1308, an appropriate response may be generated and transmitted to the calling client. As mentioned above, the appropriate response may include, but is not limited to, rejecting the incoming request, accepting the incoming request, requesting more information, providing applications for collecting more information, etc.

At decision block 1314, a determination is made as to whether more contextual information relating to the calling client and/or information relating to the incoming request needs to be collected. If it is determined at block 1314 that additional contextual information needs to be collected, at block 1316, the call center may collect the additional contextual information. In one embodiment, an application relating to the additional contextual information may be provided to the calling client if the calling client does not have such an application. Routine 1300 repeats the above steps until no additional contextual information needs to be collected.

If it is determined at block 1314 that no additional contextual information needs to be collected, at decision block 1318, a determination is made as to whether the communication channel has been rejected by the calling client. If it has not been rejected, the call center may select an appropriate routed destination based on the contextual information and route the incoming request to the appropriate routed destination at block 1320. As will be discussed in greater detail below, the call center may further obtain other relevant information such as previous call history, possible solutions, etc. The call center may determine an appropriate routed destination based on the obtained contextual information relating to the calling client and other information. If it is determined at block 1310 that no contextual information has been received or obtained, at block 1312, the call center may route the incoming request to a default routed destination, such as an operator, a contact, an agent, an IVRS, etc. After routing the incoming request to the determined routed destination (block 1312, block 1318), a communication channel may be established between the calling client and the determined routed destination as illustrated at block 1322. As mentioned above, after a communication channel is established, the routed destination, the call center and the calling client may continue exchanging contextual information over the communication channel. The routine 1300 terminates at block 1324.

It is to be understood that the embodiments explained in conjunction with the routine 1300 are provided merely for example purposes. In one embodiment, the call center continues to collect contextual information while the calling client and the routed destination are exchanging media information (including voice information). In an illustrative embodiment, the method of collecting contextual information may also be evolving based on the obtained contextual information. For example, an individual user's good mood may become bad when an IVRS starts communicating to obtain the additional contextual information. The individual user's mood can be detected by recognizing cursing words, body heat, tone of voice, stress, and the like. Upon receipt of contextual information relating to the mood change, the call center may ask whether the individual user prefers a human operator or a form (GUI) rather than an IVRS. The call center may collect contextual information in accordance with the individual user's selection. Alternatively, the call center may provide a promotion (e.g., coupons, rewards, etc.) to boost the user's mood, or an explanation of the current situation, such as a long downtime in waiting for a human operator, and the like.

In another embodiment, the call center may identify part of the calling client's contextual information which will be used to collect the additional information at the calling client's device. In this example, a set of applications for providing or invoking user interfaces may be identified based on the requested service. The call center's contextual information relating to the set of applications is transmitted to the calling client. As mentioned above, when the calling client already has a set of applications suitable for collecting the additional information, embedded instructions to invoke user interfaces may be transmitted to the calling client. Similarly, when the calling client does not have appropriate applications suitable for collecting the additional information, a set of applications for providing user interfaces may be transmitted to the calling client. The service provider collects the additional information from the calling client.

In one embodiment, the calling client may not authorize the call center (or the routed destination) to pull information from any devices of the calling client. In this embodiment, the call center may ask the calling client to provide the additional information by identifying the set of applications on the calling client device. The calling client device, in return, collects and transmits the additional information detected while implementing the set of applications. In one embodiment, the additional information needs to be obtained from third party SPs, the most appropriate third party SP for obtaining the additional information will be determined. In this embodiment, the call center may have predefined provider rules or logic to determine an appropriate source for particular information. Further, the calling client may have provided calling client rules or preferences with respect to determining an appropriate source for particular information. The additional information is obtained from the most appropriate third party SP. In an alternative embodiment, the service provider may obtain the additional information from various third party SPs and generate comprehensive information based on the obtained information.

It is understood that upon receipt of a service request, other contextual information relating to providing such service can be collected by various VoIP entities including a service provider, a device, a third party service provider, etc., and exchanged. It is also contemplated that any suitable VoIP entities other than the service provider can be responsive to the service request and can provide the requested service. In one embodiment, the requested service may be provided in such a way that the client would not know the service is provided from VoIP entities other than the service provider.

Figure 14:
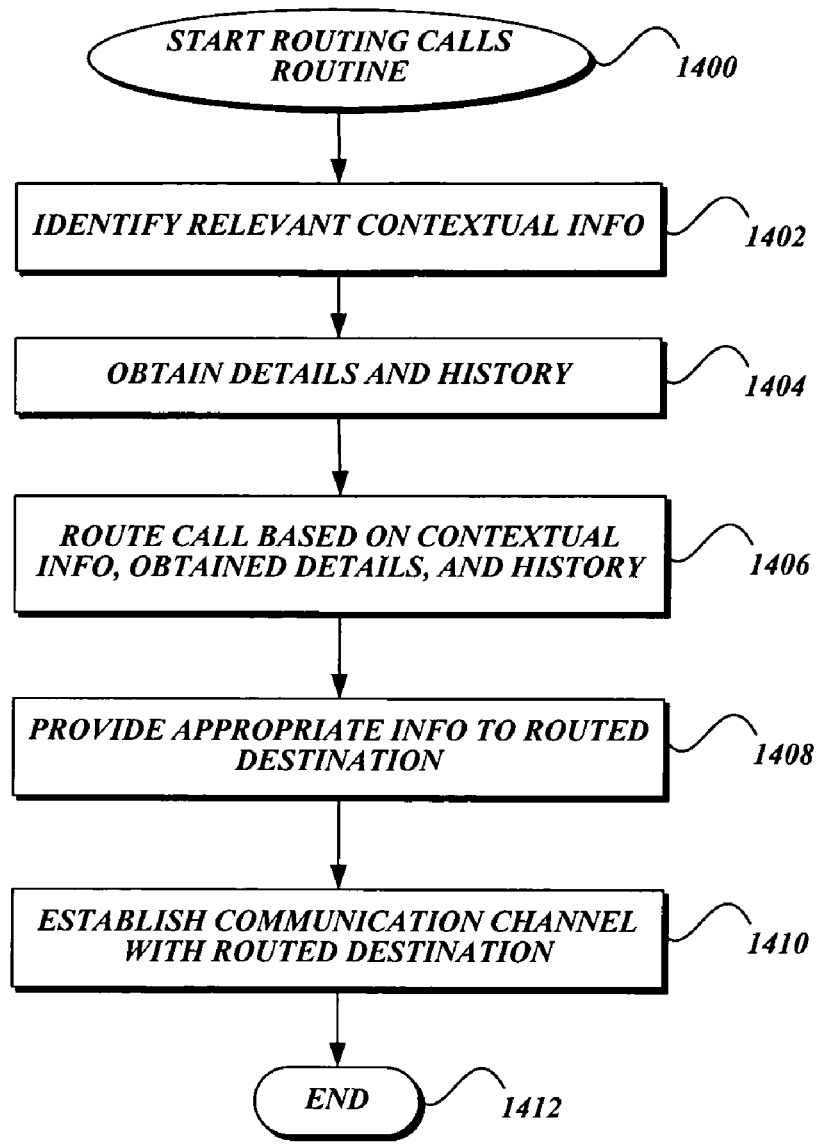
FIG. 14 is a flow diagram illustrating a routine for establishing a channel connection with a destination in accordance with an aspect of the present invention.

FIG. 14 is a flowchart illustrating a routine 1400 for routing a call to an appropriate destination in accordance with an embodiment of the present invention.

Beginning at block 1402, relevant contextual information may be identified from the obtained and/or collected contextual information which relates to the calling client, the communication channel, etc. At block 1404, the call center information including detail information which relates to previous conversations, history, previously communicated contacts, etc., may be obtained. In one embodiment, the call center may include a database which maintains details of previous conversations, previously identified problems/issues, solutions corresponding to the problems/issues, a service log which keeps records of services provided to each client, third party service providers, etc.

Some additional information relevant to determining an appropriate routed destination may need to be collected from other sources. For example, a virtual location, or geographic location of the device may be obtained from a (third party) location server. At block 1406, an appropriate routed destination may be determined based on the sets of information including the obtained contextual information of the calling client, the call center information, other relevant information, etc. At block 1408, the sets of information may be tailored to the needs of the routed destination. As such, the tailored information may include all or part of the contextual information of the calling client, the call center information, other relevant information, etc. At block 1410, the communication channel between the calling client and the call center is established. The routine 1400 terminates at block 1412.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method executing on a processor of a computing device for collecting and transmitting contextual information to route a communication channel connection, comprising:
   identifying a destination of the communication channel;
   determining a first set of contextual information to be collected that is associated with a caller;
   collecting the first set of contextual information; wherein the first set of contextual information comprises a requested service, a type of device of the caller, available media types, and preferences of the caller;
   after collecting the first set of contextual information, sending a signal to initiate the communication channel connection with the destination and transmitting the first set of contextual information to the destination over the communication channel using contextual data packets; wherein the communication channel is used to transmit and receive the contextual data packets and conversational data packets; wherein the conversation data packets are for conversation data and the contextual data packets are for data other then the conversation data;
   receiving a response from the destination; and
   collecting additional contextual information that is associated with the caller during a time of a conversation between the caller and the destination and transmitting the additional contextual information over the communication channel using the contextual data packets.

2. The method of claim 1 wherein determining a first set of contextual information includes identifying an appropriate application related to the destination.

3. The method of claim 1, wherein the response indicates that additional information is required to establish the communication channel with the destination.

4. The method of claim 3 further comprising:
   identifying a second set of contextual information relating to the additional information;
   determining if an appropriate application corresponding to the second set of contextual information is available;
   if the appropriate application is not available, obtaining the appropriate application; and
   if the appropriate application is available, selecting the appropriate application.

5. The method of claim 4 further comprising:
   collecting and transmitting the second set of contextual information in accordance with the appropriate application corresponding to the second set of contextual information; and
   receiving a response from the destination.

6. The method of claim 1, wherein the response indicates that the initiation signal is accepted to establish the communication channel with the destination.

7. The method of claim 6, further comprising:
   if there is a change in the transmitted contextual information, collecting information relating to the change and transmitting the collected information over the established communication channel.

8. The method of claim 7 further comprising:
   receiving contextual information relating to a destination's response to the transmitted information.

9. The method of claim 1, wherein the response indicates that the communication channel initiation has been rejected.

10. A method executing on a processor of a computing device for routing a communication channel signal to a destination and providing contextual information tailored for the destination, further comprising:
    receiving an incoming request to initiate a communication channel;
    determining whether contextual information associated with the communication channel has been received;
    upon determination that contextual information has been received, processing the contextual information;
    transmitting a response in accordance with the processed contextual information;
    determining a destination for the communication channel using the contextual information;
    upon determination of the destination, routing the incoming request and at least a subset of the contextual information to the destination; and
    after determining the destination using the contextual information, establishing the communication channel through which the destination exchanges conversation data with a caller using conversational data packets and contextual data using contextual data packets; wherein additional contextual information is collected during a time of a conversation between the caller and the destination and exchanged over the communication channel using the contextual data packets.

11. The method of claim 10, wherein determining a destination further comprises:
    identifying relevant contextual information;
    obtaining detailed information relating to previous communications and history; and
    based on the relevant contextual information and the detailed information, selecting at least one destination as the destination for routing the incoming request.

12. The method of claim 10, wherein routing a communication channel to the destination further comprises:
    wherein the at least the subset of contextual information includes subsets of the received contextual information and tailored information based on the need of the destination.

13. The method of claim 11, wherein the destination is a default contact if there is no received contextual information that is associated with the communication channel.

14. The method of claim 11, wherein the destination is a third party service provider.

15. The method of claim 11, wherein the request is received from a device capable of generating an automatic request for the communication channel.

16. The method of claim 10, wherein processing the contextual information includes collecting additional contextual information.

17. A computer-readable medium having computer-executable components for routing a request signal for establishing a communication channel and relevant contextual information, comprising:
- an interface component for receiving the request signal for establishing a communication channel, for receiving contextual information relating to a calling party before establishing the communication channel, and obtaining additional information;
- a routing component for determining a destination based on the contextual information and the obtained additional information, and forwarding the request and appropriate contextual information to the destination; wherein the destination and the calling party exchange voice information using conversational data packets over the communication channel and contextual information using contextual data packets over the communication channel; and
- a storage component for storing several sets of information which includes detailed information relating to history, previous communications and the destination, and information relating to the calling party including the contextual information and the obtained additional information.

18. The computer-readable medium of claim 17, wherein the additional information is obtained from at least one of the calling party, a third party service provider, a service provider of the calling party, or the storage component.

19. The computer-readable medium of claim 17, wherein the interface component obtains information relating to changes in previously received contextual information.

20. The computer-readable medium of claim 19, wherein the routing component selects another destination based on the obtained information, reroutes the communication channel to the selected destination, and provides appropriate information to the selected destination.

* * * * *

UNITED STATES PATENT AND TRADEMARK OFFICE
CERTIFICATE OF CORRECTION

PATENT NO. : 8,050,255 B2
APPLICATION NO. : 11/432163
DATED : November 1, 2011
INVENTOR(S) : Gursharan S. Sidhui et al.

It is certified that error appears in the above-identified patent and that said Letters Patent is hereby corrected as shown below:

In column 6, line 27, delete "device" and insert -- VoIP device --, therefor.

In column 6, line 31, delete "client" and insert -- VoIP client --, therefor.

In column 6, line 36, delete "client" and insert -- VoIP client --, therefor.

In column 6, line 37, delete "device" and insert -- VoIP device --, therefor.

In column 6, line 38, delete "client" and insert -- VoIP client --, therefor.

In column 6, line 40, delete "client" and insert -- VoIP client --, therefor.

In column 6, line 42, delete "device" and insert -- VoIP device --, therefor.

In column 6, line 44, delete "client" and insert -- VoIP client --, therefor.

In column 6, line 45, delete "multiple" and insert -- VoIP multiple --, therefor.

In column 6, line 46, delete "client" and insert -- VoIP client --, therefor.

In column 6, line 55, delete "device" and insert -- VoIP device --, therefor.

In column 6, line 56, delete "client" and insert -- VoIP client --, therefor.

In column 9, line 10, delete "services," and insert -- VoIP services, --, therefor.

In column 9, line 35, delete "client" and insert -- VoIP client --, therefor.

In column 9, line 36, delete "device" and insert -- VoIP device --, therefor.

Signed and Sealed this
Twenty-seventh Day of December, 2011

David J. Kappos
*Director of the United States Patent and Trademark Office*

CERTIFICATE OF CORRECTION (continued)
U.S. Pat. No. 8,050,255 B2

In column 9, line 41, delete "service" and insert -- VoIP service --, therefor.

In column 9, line 45, delete "client" and insert -- VoIP client --, therefor.

In column 9, line 45, delete "service" and insert -- VoIP service --, therefor.

In column 9, line 47, delete "service" and insert -- VoIP service --, therefor.

In column 9, line 50, delete "service" and insert -- VoIP service --, therefor.

In column 9, line 55, delete "clients" and insert -- VoIP clients --, therefor.

In column 9, line 64, delete "Client" and insert -- VoIP Client --, therefor.

In column 10, line 2, delete "Client 606" and insert -- VoIP Client 606 --, therefor.

In column 10, line 2, delete "Client 608" and insert -- VoIP Client 608 --, therefor.

In column 10, line 5, delete "Client" and insert -- VoIP Client --, therefor

In column 10, line 10, delete "clients." and insert -- VoIP clients. --, therefor.

In column 10, line 12, delete "Client 606" and insert -- VoIP Client 606 --, therefor.

In column 10, line 13, delete "Client 608." and insert -- VoIP Client 608. --, therefor.

In column 10, line 14, delete "client" and insert -- VoIP client --, therefor.

In column 10, lines 37-38, delete "entities" and insert -- VoIP entities --, therefor.

In column 10, line 67, delete "entities" and insert -- VoIP entities --, therefor.

In column 11, line 52, delete "Client 606" and insert -- VoIP Client 606 --, therefor.

In column 14, line 41, delete "contextual" and insert -- VoIP contextual --, therefor.

In column 16, lines 60-61, delete "client" and insert -- VoIP client --, therefor.

In column 19, line 38, delete "entities" and insert -- VoIP entities --, therefor.

In column 19, line 52, after "signal path" insert -- needs to be re-established. In one embodiment, a signal path may expire after a --.